United States Patent
Short, Jr. et al.

(10) Patent No.: US 12,248,062 B1
(45) Date of Patent: Mar. 11, 2025

(54) ENHANCED MATERIAL DETECTION AND FREQUENCY SWEEP ANALYSIS OF CONTROLLED SUBSTANCES VIA DIGITAL SIGNAL PROCESSING

(71) Applicant: QUANTUM IP, LLC, Stuart, FL (US)

(72) Inventors: Robert J. Short, Jr., Stuart, FL (US); Lee Duke, Stuart, FL (US)

(73) Assignee: QUANTUM IP, LLC, Stuart, FL (US)

( * ) Notice: Subject to any disclaimer, the term of this patent is extended or adjusted under 35 U.S.C. 154(b) by 0 days.

(21) Appl. No.: 18/922,702

(22) Filed: Oct. 22, 2024

Related U.S. Application Data

(60) Provisional application No. 63/667,578, filed on Jul. 3, 2024.

(51) Int. Cl.
G01S 13/88 (2006.01)

(52) U.S. Cl.
CPC .................. G01S 13/887 (2013.01)

(58) Field of Classification Search
CPC .......... G01S 13/88; G01S 13/885; G01S 7/03; G01S 13/753; G01S 13/887; G01S 13/89; G01S 13/90; G01S 7/412; G01S 7/411; G01S 13/04; G01S 7/352; G01S 7/417; G01S 7/52004; H01Q 13/10; G01V 3/12; G01V 3/17; H02J 50/20; H02J 50/12
See application file for complete search history.

(56) References Cited

U.S. PATENT DOCUMENTS

| | | | |
|---|---|---|---|
| 2,116,717 A | 5/1938 | Hans | |
| 3,725,917 A | 4/1973 | Sletten et al. | |
| 3,983,558 A | 9/1976 | Rittenbach | |
| 4,132,943 A | 1/1979 | Gournay et al. | |
| 4,217,585 A | 8/1980 | Fishbein et al. | |
| 4,296,378 A | 10/1981 | King | |
| 4,514,691 A | 4/1985 | De Los Santos et al. | |
| 4,897,660 A * | 1/1990 | Gold | G01S 7/414 342/134 |
| 5,227,800 A | 7/1993 | Huguenin et al. | |

(Continued)

FOREIGN PATENT DOCUMENTS

CN 117091456 11/2023

OTHER PUBLICATIONS

PCT Application No. PCT/US2024/039348, International Search Report and Written Opinion dated Oct. 17, 2024.

(Continued)

*Primary Examiner* — Olumide Ajibade Akonai
(74) *Attorney, Agent, or Firm* — Polsinelli LLP

(57) ABSTRACT

A system for material detection and identification includes an interface configured to access a material database associating each of a plurality of materials with a resonance frequency and one or more transmission parameters; an RF transmitter configured to, for each material of at least a subset of the plurality of materials in the material database transmit into an environment an RF signal the resonance frequency for the material using the one or more transmission parameters; an RF receiver configured to receive a response signal from the environment; and a processor configured to analyze the response signal for resonance characteristics that indicate a presence of the material and identify the material to a user if the presence of the material is indicated by the resonance characteristics.

20 Claims, 4 Drawing Sheets

(56) References Cited

U.S. PATENT DOCUMENTS

| | | | |
|---|---|---|---|
| 5,233,300 | A | 8/1993 | Buess et al. |
| 5,592,083 | A | 1/1997 | Magnuson et al. |
| 5,745,071 | A * | 4/1998 | Blackmon, Jr. ....... G01S 13/878 342/463 |
| 6,359,582 | B1 * | 3/2002 | MacAleese .............. G01V 3/12 342/197 |
| 6,967,612 | B1 | 11/2005 | Gorman et al. |
| 7,251,310 | B2 | 7/2007 | Smith |
| 7,288,927 | B2 | 10/2007 | Nutting et al. |
| 7,405,692 | B2 | 7/2008 | McMakin et al. |
| 7,825,648 | B2 | 11/2010 | Nutting et al. |
| 8,138,770 | B2 | 3/2012 | Pechmann et al. |
| 8,188,862 | B1 * | 5/2012 | Tam ......................... G01V 3/12 340/561 |
| 8,242,447 | B1 | 8/2012 | Chawla |
| 8,242,450 | B2 | 8/2012 | Gaziano |
| 8,502,666 | B1 * | 8/2013 | Tam ......................... G01V 3/12 340/544 |
| 8,890,745 | B2 | 11/2014 | Wahlquist et al. |
| 9,182,481 | B2 | 11/2015 | Bowring et al. |
| 9,500,609 | B1 | 11/2016 | Zank |
| 9,915,727 | B1 | 3/2018 | Reznack et al. |
| 10,204,775 | B2 | 2/2019 | Brown et al. |
| 10,229,328 | B2 | 3/2019 | Nikolova et al. |
| 10,268,889 | B2 | 4/2019 | Brown et al. |
| 10,816,658 | B2 | 10/2020 | Frizzell |
| 10,890,656 | B2 | 1/2021 | Heinen |
| 11,280,898 | B2 | 3/2022 | Morton |
| 11,422,252 | B2 | 8/2022 | Bowring et al. |
| 11,493,494 | B2 | 11/2022 | Wilson et al. |
| 2002/0008655 | A1 * | 1/2002 | Haj-Yousef .............. G01V 3/12 342/104 |
| 2003/0196543 | A1 | 10/2003 | Moser et al. |
| 2004/0039713 | A1 | 2/2004 | Beck |
| 2004/0232054 | A1 | 11/2004 | Brown et al. |
| 2005/0081634 | A1 | 4/2005 | Matsuzawa |
| 2005/0230604 | A1 | 10/2005 | Rowe et al. |
| 2006/0008051 | A1 | 1/2006 | Heaton et al. |
| 2008/0283761 | A1 | 11/2008 | Robinson et al. |
| 2009/0085565 | A1 * | 4/2009 | Fullerton .............. G01R 33/441 324/307 |
| 2009/0195435 | A1 | 8/2009 | Kapilevich et al. |
| 2009/0262005 | A1 | 10/2009 | McNeill et al. |
| 2010/0046704 | A1 | 2/2010 | Song et al. |
| 2010/0079280 | A1 | 4/2010 | Lacaze et al. |
| 2010/0128852 | A1 | 5/2010 | Yamamoto et al. |
| 2010/0134102 | A1 | 6/2010 | Crowley |
| 2010/0182594 | A1 | 7/2010 | Carron |
| 2011/0050241 | A1 | 3/2011 | Nutting et al. |
| 2011/0233419 | A1 | 9/2011 | Norris |
| 2012/0248313 | A1 | 10/2012 | Karam et al. |
| 2015/0160181 | A1 | 6/2015 | White et al. |
| 2016/0011307 | A1 | 1/2016 | Casse et al. |
| 2016/0047757 | A1 | 2/2016 | Kuznetsov et al. |
| 2016/0166843 | A1 | 6/2016 | Casse et al. |
| 2016/0195608 | A1 | 7/2016 | Ruenz |
| 2016/0223666 | A1 | 8/2016 | Kim et al. |
| 2016/0274230 | A1 | 9/2016 | Wu et al. |
| 2016/0327634 | A1 | 11/2016 | Katz et al. |
| 2017/0011255 | A1 | 1/2017 | Kaditz et al. |
| 2017/0350834 | A1 | 12/2017 | Prado et al. |
| 2018/0067204 | A1 | 3/2018 | Frizzell |
| 2019/0137653 | A1 | 5/2019 | Starr et al. |
| 2019/0154439 | A1 | 5/2019 | Binder |
| 2019/0219687 | A1 | 7/2019 | Baheti et al. |
| 2020/0166634 | A1 | 5/2020 | Peleg |
| 2020/0173970 | A1 | 6/2020 | Wilson et al. |
| 2020/0333412 | A1 | 10/2020 | Nichols et al. |
| 2020/0371227 | A1 | 11/2020 | Malhi |
| 2021/0041376 | A1 | 2/2021 | Ashiwal et al. |
| 2021/0096240 | A1 | 4/2021 | Padmanabhan et al. |
| 2021/0312201 | A1 | 10/2021 | Hastings et al. |
| 2021/0373098 | A1 | 12/2021 | Fraundorfer et al. |
| 2022/0171017 | A1 | 6/2022 | McFadden et al. |
| 2022/0265882 | A1 | 8/2022 | Lemchen |
| 2022/0311135 | A1 | 9/2022 | Guo et al. |
| 2022/0408643 | A1 | 12/2022 | Somarowthu et al. |
| 2023/0243761 | A1 | 8/2023 | Somarowthu et al. |
| 2023/0375695 | A1 | 11/2023 | Tan |
| 2024/0036166 | A1 | 2/2024 | Geng et al. |
| 2024/0372600 | A1 | 11/2024 | Schreck et al. |

OTHER PUBLICATIONS

U.S. Appl. No. 18/921,840, Robert J. Short Jr., RF-Based Material Detection Device That Uses Specific Antennas Designed for Specific Substances, filed Oct. 21, 2024.

U.S. Appl. No. 18/922,682, Robert J. Short Jr., Enhanced Antenna Materials for Low-Frequency Detection of Materials, filed Oct. 22, 2024.

U.S. Appl. No. 18/922,693, Robert J. Short Jr., Dynamic Phased Array Resonator Systems and Methods for Determining a Material Substance, filed Oct. 22, 2024.

U.S. Appl. No. 18/923,518, Robert J. Short Jr., Currency RF-Based Verification Device, filed Oct. 22, 2024.

U.S. Appl. No. 18/922,729, Robert J. Short Jr., RF-Based Detection Device for Material Identification Using a Smart Frequency Selection Method, filed Oct. 22, 2024.

U.S. Appl. No. 18/929,189, Robert J. Short Jr., RF-Specific Material Detection Device for an Applicationn-Specific Device, filed Oct. 28, 2024.

U.S. Appl. No. 18/782,964, Robert J. Short Jr., RF-Based Material Identification Systems and Methods, filed Jul. 24, 2024.

PCT/US2024/039348, WO, Robert J. Short Jr., RF-Based Material Identification Systems and Methods, Jul. 24, 2024.

U.S. Appl. No. 18/934,569, Robert J. Short Jr., Networked RF Material Devices for Substance Detection via Opposed Perimeter Sensors, filed Nov. 1, 2024.

U.S. Appl. No. 18/939,132, Robert J. Short Jr., RF Material Detection Device With Smart Scanning Multiple Axis Gimbal Integrated With Haptics, filed Nov. 6, 2024.

U.S. Appl. No. 18/938,584, Robert J. Short Jr., RF Transmit and Receiver Antenna Detector System, filed Nov. 6, 2024.

U.S. Appl. No. 18/936,177, Robert J. Short Jr., Method and System for Detecting and Quantifying Specific Substances, Elements, or Conditions Utilizing an AI Module, filed Nov. 4, 2024.

U.S. Appl. No. 18/942,906, Robert J. Short Jr., RF-Specific Material Detection Device Integrated Into Application-Specific Drone Device, filed Nov. 11, 2024.

U.S. Appl. No. 18/936,500, Robert J. Short Jr., RF-Based Special Material Detection System With Secure Multi-Dimensional Authentication, filed Nov. 4, 2024.

U.S. Appl. No. 18/938,691, Robert J. Short Jr., RF-Based AI Determination of Materials by Cycling Through Detection Patterns for Specific Applications, filed Nov. 6, 2024.

U.S. Appl. No. 18/946,014, Robert J. Short Jr., RF-Based Special Material Detection Securing Entry Points And Access, filed Nov. 13, 2024.

U.S. Appl. No. 18/922,693, Non-Final Office Action dated Nov. 26, 2024.

U.S. Appl. No. 18/922,729, Non-Final Office Action dated Dec. 16, 2024.

US Application No. 18/929,189, Non-Final Office Action dated Jan. 24, 2025.

U.S. Appl. No. 18/782,964, Non-Final Office Action dated Dec. 6, 2024.

U.S. Appl. No. 18/939,132, Non-Final Office Action dated Dec. 26, 2024.

U.S. Appl. No. 18/936,177, Non-Final Office Action dated Jan. 21, 2025.

U.S. Appl. No. 18/936,500, Non-Final Office Action dated Dec. 23, 2024.

U.S. Appl. No. 18/946,014, Non-Final Office Action dated Jan. 16, 2025.

Erricolo et al., "Machine Learning in Electromagnetics: A Review and Some Perspectives for Future Research," 2019 International Conference on Electromagnetics in Advanced Applications (ICEAA),

(56) References Cited

OTHER PUBLICATIONS

Granada, Spain, 2019, pp. 1377-1380, doi: 10.1109/ICEAA.2019.8879110.

Ibrahim et al., "A Subspace Signal Processing Technique for Concealed Weapons Detection," 2007 IEEE International Conference on Acoustics, Speech and Signal Processing—ICASSP '07, Honolulu, HI, USA, pp. II-401-II-404, doi: 10.1109/ICASSP.2007.366257, 2007.

Itozaki et al., "Nuclear Quadrupole Resonance for Explosive Detection," International Journal on Smart Sensing and Intelligent Systems, vol. 1, No. 3, Sep. 2008.

* cited by examiner

| Quantity (kg) | Distance (m) | Received Signal @ Power Level 1 (dB) | Received Signal @ Power Level 2 (dB) | Received Signal @ Power Level 3 (dB) | Received Signal @ Power Level 4 (dB) |
| --- | --- | --- | --- | --- | --- |
| 0.5 | 10 | -90 | -80 | -75 | -70 |
| 0.5 | 20 | -100 | -90 | -85 | -80 |
| 1 | 10 | -45 | -40 | -38 | -35 |
| 1 | 20 | -50 | -45 | -43 | -40 |
| 2 | 10 | -22.5 | -20 | -19 | -17.5 |
| 2 | 20 | -25 | -22.5 | -21.5 | -20 |
| 5 | 10 | -11.25 | -10 | -9.5 | -8.75 |
| 5 | 20 | -12.5 | -11.25 | -10.75 | -10 |
| - | - | - | - | - | - |
| - | - | - | - | - | - |
| - | - | - | - | - | - |

ENHANCED MATERIAL DETECTION AND FREQUENCY SWEEP ANALYSIS OF CONTROLLED SUBSTANCES VIA DIGITAL SIGNAL PROCESSING

CROSS-REFERENCE TO RELATED APPLICATIONS

This application claims the benefit of U.S. Provisional Application No. 63/667,578, filed Jul. 3, 2024, which is incorporated herein by reference.

FIELD OF THE DISCLOSURE

The present disclosure is generally related to enhanced material detection and frequency sweep analysis of controlled substances via digital signal processing.

BACKGROUND

Currently, traditional methods of detecting hazardous materials, such as explosives or toxic substances, often suffer from inaccuracies and false positives due to interference and environmental noise. Many existing detection systems require direct contact with the material or complex sample preparation, which can be time-consuming, impractical, and risky in certain situations. Also, detecting small quantities of substances, such as trace amounts of explosives, is challenging for conventional systems, leading to potential security risks. Distinguishing between substances with similar properties can be difficult for standard detection systems, resulting in ambiguous or incorrect identification. Lastly, field applications, such as environmental monitoring or security screening, require portable and efficient detection systems that can quickly and accurately identify substances on-site. Thus, there is a need in the prior art for enhanced material detection and frequency sweep analysis of controlled substances via digital signal processing.

SUMMARY

Figure 1:
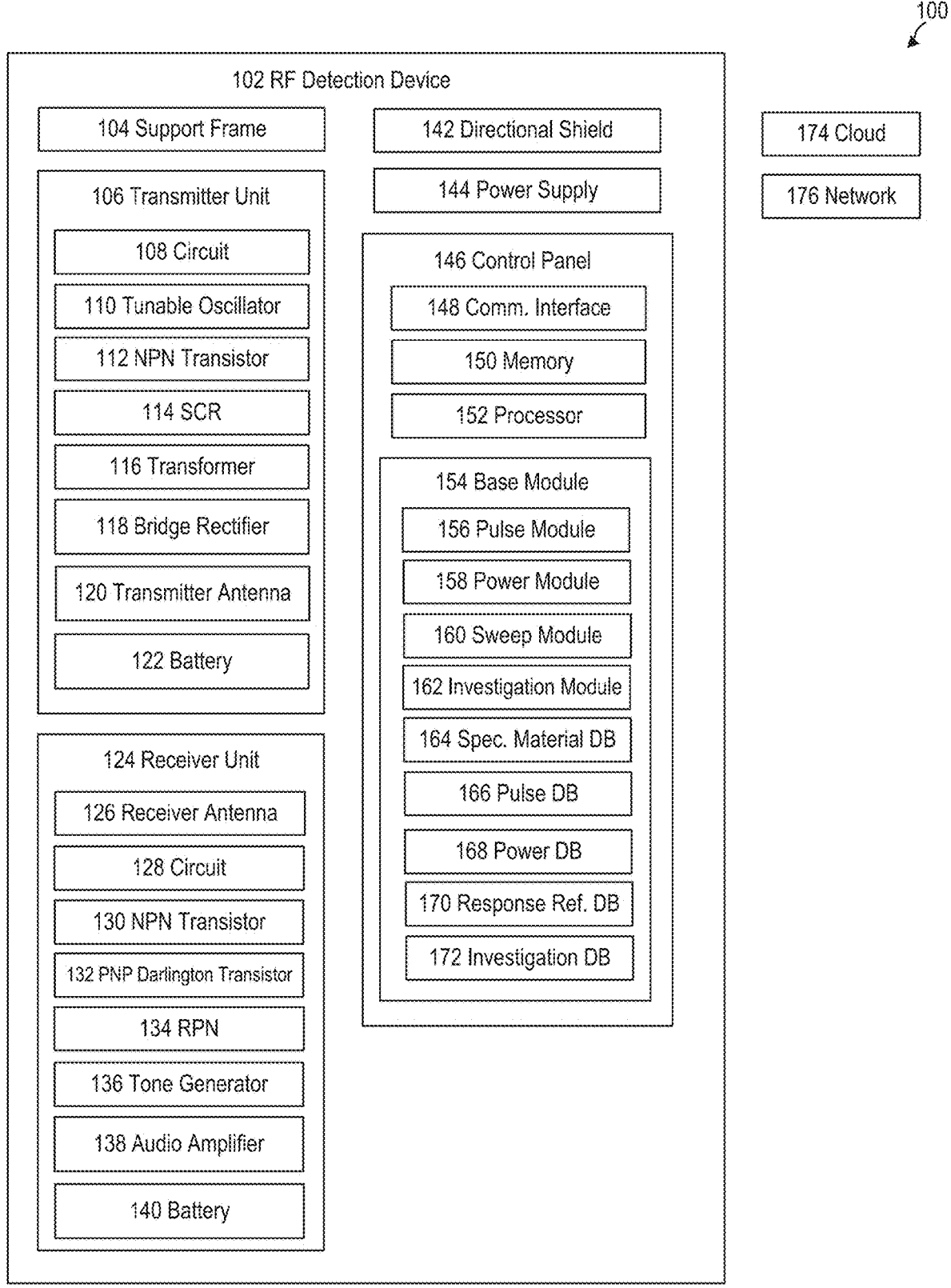
FIG. 1 is a schematic diagram of an Enhanced Material Detection System, according to an embodiment.

According to one aspect, a method for material detection and identification includes accessing a material database associating each of a plurality of materials with a resonance frequency and one or more transmission parameters. The method also includes, for each material of at least a subset of the plurality of materials in the material database: transmitting into an environment an RF signal the resonance frequency for the material using the one or more transmission parameters; receiving a response signal from the environment; analyzing the response signal for resonance characteristics that indicate a presence of the material; and identifying the material to a user if the presence of the material is indicated by the resonance characteristics.

In some embodiments, the one or more transmission parameters include pulse sequence parameters.

In some embodiments, the pulse sequence parameters include one or more of a pulse duration, a pulse interval, and a pulse count.

In some embodiments, analyzing the response signal includes determining if the response signal is received between each pulse sequence.

In some embodiments, the one or more transmission parameters include one or more of a power level and an amplitude.

In some embodiments, transmitting includes transmitting into the environment the RF signal the resonance frequency at varying power levels and/or amplitudes.

In some embodiments, the material database includes one or more pre-calibrated response curves relating transmitted power levels to received response signal strengths for known quantities and/or distances of the materials, wherein analyzing includes determining a quantity and/or distance of the material based on the one or more pre-calibrated response curves.

In some embodiments, the one or more transmission parameters include a frequency range for the material, wherein the resonance frequency is contained within the frequency range, and wherein transmitting includes transmitting into the environment a plurality of RF signals within the frequency range for the material.

In some embodiments, the resonance frequency is centered within the frequency range.

In some embodiments, the material is a controlled substance.

According to another aspect, a system for material detection and identification includes an interface configured to access a material database associating each of a plurality of materials with a resonance frequency and one or more transmission parameters. The system also includes an RF transmitter configured to, for each material of at least a subset of the plurality of materials in the material database transmit into an environment an RF signal the resonance frequency for the material using the one or more transmission parameters. The system further includes an RF receiver configured to receive a response signal from the environment. Additionally, the system includes a processor configured to analyze the response signal for resonance characteristics that indicate a presence of the material and identify the material to a user if the presence of the material is indicated by the resonance characteristics.

In some embodiments, the one or more transmission parameters include pulse sequence parameters.

In some embodiments, the pulse sequence parameters include one or more of a pulse duration, a pulse interval, and a pulse count.

In some embodiments, analyzing the response signal includes determining if the response signal is received between each pulse sequence.

In some embodiments, the one or more transmission parameters include one or more of a power level and an amplitude.

In some embodiments, transmitting includes transmitting into the environment the RF signal the resonance frequency at varying power levels and/or amplitudes.

In some embodiments, the material database includes one or more pre-calibrated response curves relating transmitted power levels to received response signal strengths for known quantities and/or distances of the materials, wherein analyzing includes determining a quantity and/or distance of the material based on the one or more pre-calibrated response curves.

In some embodiments, the one or more transmission parameters include a frequency range for the material, wherein the resonance frequency is contained within the frequency range, and wherein transmitting includes transmitting into the environment a plurality of RF signals within the frequency range for the material.

In some embodiments, the resonance frequency is centered within the frequency range.

In some embodiments, the material is a controlled substance.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

FIG. 1 illustrates an enhanced material detection system and method of frequency sweep analysis of controlled substances via digital signal processing. This system may include an RF detection device 102, which may be a specialized system designed to detect and identify specific materials based on their unique resonance frequencies when exposed to electromagnetic signals. The RF detection device 102 incorporates an RF detection system similar to that disclosed in patent U.S. Ser. No. 11/493,494B2, employing RF signals for the detection and identification of materials based on their resonance characteristics. The RF detection device 102 may operate by transmitting RF signals into the environment and analyzing the received signals for resonance characteristics that indicate the presence of a target material. The RF detection device 102 may be designed to detect a target material based on its resonance properties with specific RF frequencies. It utilizes the principle that materials resonate at particular frequencies when exposed to external RF signals, allowing for their identification and potential quantification. The RF detection device 102 may include a transmitter unit 106, a receiver unit 124, a control panel 146, a transmitter antenna 120, a receiver antenna 126, a directional shield 142, and a power supply 144. Upon activation, the control panel 146 initializes the system, powering up the transmitter unit 106, the receiver unit 124, and associated electronics. The control panel 146 may instruct the transmitter unit 106 to generate RF signals at specified frequencies, such as 180 Hz, 1800 Hz, etc., and amplitudes, such as 320V, 160V, etc., known to resonate with a target material. The transmitter unit 106 emits these RF signals through the transmit antenna 120 into the testing environment. The receiver unit 124 captures the RF signals using the receive antenna 126. It then processes the received signals to identify resonance frequencies that indicate the presence of the target material.

Further, embodiments may include a support frame 104, which may be a structural component designed to provide stability and support to various subsystems and components of the RF detection device 102. The support frame 104 may provide proper alignment and positioning of the components, such as the transmitter unit 106, the receiver unit 124, antennas 120 126, and control panel 146. The support frame 104 may provide mounting points and secure attachment locations for subsystems such as the transmitter unit 106, the receiver unit 124, antennas 120 126, and control panel 146. By maintaining precise alignment and stability, the support frame 104 may minimize vibrations and unwanted movements that could interfere with the accuracy of RF signal transmission and reception. In some embodiments, the support frame 104 may be constructed from durable materials such as metal alloys or rigid polymers.

Further, embodiments may include a transmitter unit 106, which may include an electronic circuit 108, powered by a battery, such as a 12-volt, 1.2 amp battery, with a regulated output of nine volts. The circuit 108 may use a 555 timer as a tunable oscillator to generate a pulse rate. The output of the oscillator is fed in parallel to an NPN transistor 112 and a silicon-controlled rectifier (SCR) 114. The transistor may be used as a common emitter amplifier stage driving a transformer 116. The transformer 116 may be used to step up the voltage as needed. The balanced output of the transformer 116 feeds a bridge rectifier 118. The rectified direct current flows through a 100 K, three-watt resistor to terminal B of the transmitter antenna 120. A plurality of resistors and capacitors may fill in the circuit 108. In some embodiments, the transmitter antenna 120 may be formed from a coil of about 25 meters of 14-strand wire tightly wound around a one-centimeter PVC core. The transmitter antenna 120 may be, in one exemplary embodiment, in a 1"×3" configuration at the bottom end of the support frame 104. In some embodiments, the transmitter antenna 120 may be shielded approximately 315 degrees with the directional shield 142, formed from aluminum and copper, leaving a two-inch opening. Terminal A of the transmitter antenna 120 is switched to ground through the SCR 114. The SCR 114 is "fired" by the output of the 555 timer. This particular configuration generates a narrow pulsed waveform to the transmitter antenna 120 at a pulse rate as set by the 555 timer. Power is delivered through the 3 W resistor. Frequencies down to 4 Hz are achieved by an RC network containing a 100 K pot, a switch, and one of two capacitive paths. The circuit 108 may provide simple RC-controlled timing and deliver pulses to the primary of a step-up transformer 116, the output of which is full-wave rectified and fed to the transmitter antenna 120. The pulse rate is adjustable from the low-Hz range to the low-kHz range. The sharp pulses at low repetition frequencies yield a wide spectrum of closely spaced lines. The pulse rate is adjusted depending on the material to be detected. In some embodiments, one or more portions of the transmitter unit 106 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a circuit 108, which may be an assembly of electronic components that generate, modulate, and transmit radio frequency, RF, signals. The circuit 108 may include oscillators, amplifiers, modulators, and other components that work together to produce a specific RF signal, which can then be transmitted through the transmitter antenna 120. The circuit 108 may include an oscillator, which generates a stable RF signal at a specified frequency. This frequency is selected based on the resonance characteristics of the target material. For example, the system may operate at 180 Hz or 1800 Hz, depending on the specific requirements of the detection task. Once generated, the RF signal is fed into an amplifier. The amplifier boosts the signal strength to a level suitable for transmission over the required distance. This ensures that the signal can propagate through various media and reach the receiver unit effectively. Modulation circuits are used to encode information into the RF signal. This may involve varying the amplitude, frequency, or phase of the signal to carry specific data related to the detection process. Modulation ensures that the transmitted signal can be uniquely identified and distinguished from other signals in the environment. The circuit 108 may include power control components that regulate the voltage and current supplied to the oscillator and amplifier. This ensures consistent signal output and helps in managing the power consumption of the device. In some embodiments, the transmitter may operate at voltages such as 160V and 320V, with adjustments made to optimize detection performance. The amplified and modulated RF signal is then routed to the transmitter antenna 120. The transmitter antenna 120 converts the electrical signal into an electromagnetic wave that can propagate through the air or other media. In some embodiments, the circuit 108 may be integrated with the device's control systems, allowing for automated adjustments based on pre-set parameters or operator inputs.

Further, embodiments may include a tunable oscillator 110, which may be a type of electronic component that generates a periodic waveform with a frequency that can be adjusted or tuned over a specific range. The tunable oscillator 110 within the transmitter unit 106 may be utilized to generate the RF signal that will be transmitted by the RF detection device 102. The tunable oscillator 110 in the transmitter unit 106 may be employed to produce an RF signal whose frequency can be precisely controlled. By adjusting the control inputs, the frequency of the output signal can be varied, allowing the system to adapt to different detection requirements and environmental conditions. This tuning mechanism may ensure that the oscillator produces a signal at the correct frequency needed for effective resonance with the target materials. By tuning the oscillator to specific frequencies, the system may detect various substances based on their unique resonant properties. The tunable oscillator 110 may work in conjunction with the control panel 146, which sends control signals to adjust the oscillator's frequency as needed. The tunable oscillator 110 may act as the core signal generation component in the transmitter unit 106. When the control panel 146 determines the required frequency for detection, it sends control signals to the tunable oscillator 110. The oscillator then adjusts its frequency accordingly, generating an RF signal that matches the desired parameters. The tunable oscillator 110 may be connected to other components within the transmitter unit 106, such as the SCR 114 and the transformer 116. The SCR 114 manages the power supply to the oscillator, ensuring it receives the correct voltage. The transformer 116 steps up the voltage to the appropriate level required by the oscillator.

Further, embodiments may include an NPN transistor 112, which may be a type of bipolar junction transistor, BJT, that consists of three layers of semiconductor material: a layer of p-type material, the base layer, sandwiched between two layers of n-type material, the emitter and the collector. When a small current flows into the base, it allows a larger current to flow from the collector to the emitter, effectively acting as a current amplifier or switch in electronic circuits. The NPN transistor 112 in the transmitter unit 106 amplifies the RF signal generated by the oscillator. The NPN transistor 112 may operate in its active region, where a small input current applied to the base controls a larger current flowing from the collector to the emitter. This amplification process ensures that the RF signal reaches a sufficient power level for effective transmission. In some embodiments, the NPN transistor 112 may also function as a switch, controlling the flow of current within the circuit 108. When the base-emitter junction is forward-biased, a small voltage is applied, and the NPN transistor 112 allows current to flow from the collector to the emitter. This switching action is used to modulate the RF signal, encoding information onto the carrier wave as required for the detection process. Proper biasing of the NPN transistor 112 is beneficial for stable operation. In some embodiments, resistors may be used to establish the correct biasing conditions to ensure that the NPN transistor 112 operates in its linear region for amplification or in saturation/cutoff regions for switching. The biasing circuit ensures that the NPN transistor 112 responds predictably to input signals, maintaining signal integrity. In some embodiments, the NPN transistor 112 may be involved in modulating the RF signal. By varying the input current to the base, the amplitude, frequency, or phase of the RF signal can be modulated. This modulation is critical for encoding the detection data onto the transmitted signal, allowing for accurate chemical identification and analysis. In some embodiments, the NPN transistor 112 may be integrated into the broader transmitter circuit 108, working in conjunction with other components such as capacitors, inductors, and resistors. This integration ensures that the NPN transistor's 112 amplification and switching actions are synchronized with the overall signal generation and transmission process. The circuit 108 design may leverage the NPN transistor's 112 properties to achieve the desired RF output characteristics.

Further, embodiments may include an SCR 114, or silicon-controlled rectifier, which may be a type of semiconductor device that functions as a switch and rectifier, allowing current to flow only when a control voltage is applied to its gate terminal. The silicon-controlled rectifier, SCR, 114 is utilized within the transmitter unit 106 to manage and control the power delivery to the RF signal generation components. The SCR 114 in the transmitter unit 106 may be employed to control the flow of power to the RF oscillator circuit. By applying a gate signal to the SCR 114, it switches from a non-conductive state to a conductive state, allowing current to pass through and power the oscillator. This control mechanism ensures that the oscillator only receives power when required, thereby conserving energy and preventing unnecessary power dissipation. The SCR 114 may act as a switching element in the transmitter unit 106. When the control panel 146 determines that the RF signal needs to be generated, a gate voltage is applied to the SCR 114. This triggers the SCR 114 to conduct, completing the circuit and enabling current to flow to the RF oscillator. The SCR 114 may ensure that sufficient current is supplied to the oscillator to produce a strong RF signal without being damaged by the high power levels. The gate terminal of the SCR 114 may be connected to the control panel 146, which manages the timing and application of the gate signal. This integration ensures that the SCR 114 is activated precisely when the RF signal needs to be transmitted, in sync with the overall operation of the detection system. The control panel 146 sends the appropriate signal to the SCR 114, ensuring accurate timing and efficient power usage. The SCR 114 may also serve as a protective component in the transmitter unit 106. By controlling the power flow, it prevents overloading and potential damage to the RF oscillator and other sensitive components. If the system detects any abnormal conditions, the control panel 146 can withhold the gate signal, keeping the SCR 114 in a non-conductive state and thereby cutting off power to protect the circuit.

Further, embodiments may include a transformer 116, which is an electrical device that transfers electrical energy between two or more circuits through electromagnetic induction. The transformer 116 is utilized within the transmitter unit 106 to manage and control the voltage levels required for the RF signal generation and transmission. The transformer 116 in transmitter unit 106 may be employed to step up or down the voltage as needed to ensure the proper operation of the RF oscillator circuit. By adjusting the voltage levels, the transformer 116 ensures that the components within the transmitter unit receive the appropriate voltage for efficient functioning. The transformer 116 may act as a voltage regulation element in the transmitter unit 106. When the control panel 146 determines that the RF signal needs to be generated, the transformer 116 adjusts the input voltage to the desired level. This adjustment involves converting the primary winding voltage to a higher or lower voltage in the secondary winding, depending on the requirements of the RF oscillator. The transformer ensures that the oscillator receives a stable and appropriate voltage, which is critical for producing a consistent and strong RF signal. The primary winding of transformer 116 may be connected to the power supply 144, while the secondary winding is connected to the RF oscillator circuit. This integration ensures that transformer 116 can effectively manage the voltage levels needed for RF signal generation. The control panel 146 monitors and regulates the input voltage to the transformer 116, ensuring accurate and efficient voltage conversion and delivery to the RF oscillator.

Further, embodiments may include a bridge rectifier 118, which is an electrical device designed to convert alternating current, AC, to direct current, DC, using a combination of four diodes arranged in a bridge configuration. The bridge rectifier 118 is utilized within the transmitter unit 106 to ensure that the RF signal generation components receive a steady and reliable DC power supply. The bridge rectifier 118 in the transmitter unit 106 may be employed to convert the incoming AC voltage from the power supply into a DC voltage. By using all portions of the AC waveform, the bridge rectifier 118 provides full-wave rectification, resulting in a more efficient conversion process and producing a smoother and more stable DC output. The bridge rectifier 118 may act as a power conversion element in the transmitter unit 106. When the control panel 146 determines that the RF signal needs to be generated, the AC voltage supplied to the transmitter unit is passed through the bridge rectifier 118. The rectifier converts the AC voltage into a DC voltage by directing the positive and negative halves of the AC waveform through the appropriate diodes. This process results in a continuous DC voltage output that is used to power the RF oscillator and other critical components. The input terminals of the bridge rectifier 118 may be connected to the AC power supply, while the output terminals provide the rectified DC voltage to the RF oscillator circuit. This integration ensures that the bridge rectifier 118 can effectively convert and deliver the required DC power for RF signal generation. The control panel 146 monitors the output of the bridge rectifier, ensuring that the DC voltage is stable and within the desired range for optimal performance.

Further, embodiments may include a transmitter antenna 120, which may be a device that radiates radio frequency, RF, signals generated by the transmitter unit 106 towards a target material. The transmitter antenna 120 may be designed to efficiently transmit the generated RF signals into the surrounding environment and ensure the signals reach the intended target with minimal loss. The transmitter antenna 120 may be responsible for the emission of RF signals for detecting materials at a distance. In some embodiments, the transmitter antenna 120 may operate within a specific frequency range suitable for detecting the atomic structures and characteristics of the target materials. The frequency range may be determined by the system's requirements and the properties of the materials being detected. In some embodiments, the gain of the transmitter antenna 120 may be a measure of its ability to direct the RF energy toward the target. Higher gain transmitter antenna 120 focus the energy more effectively, resulting in stronger signal transmission over longer distances. The transmitter antenna 120 gain may be optimized for the operational frequency range. In some embodiments, the radiation pattern of the transmitter antenna 120 describes the distribution of radiated energy in space. For effective material detection, the transmitter antenna 120 may have a directional radiation pattern, concentrating the RF energy in a specific direction to enhance detection accuracy. In some embodiments, impedance matching between the transmitter antenna 120 and the transmitter unit 106 may maximize power transfer and minimize signal reflection. Proper impedance matching may ensure efficient operation and reduce losses in the transmission path. In some embodiments, the physical design of the transmitter antenna 120 may include configurations such as dipole, patch, or horn antennas, depending on factors such as frequency range, gain, and environmental conditions. In some embodiments, the transmitter antenna 120 may be integrated with the transmitter unit 106 and other system components through connectors and mounting structures to ensure stable and reliable operation, with considerations for minimizing interference and signal loss.

Further, embodiments may include a battery 122, which may be a type of energy storage device that provides a stable and portable power source for the transmitter unit 106. The battery 122 within the transmitter unit 106 may be utilized to supply the electrical energy to the various components involved in generating and transmitting the RF signal. The battery 122 may be designed to store electrical energy and supply it to the respective components as required. The battery 122 may be rechargeable or replaceable cells capable of providing DC voltage. They are selected based on factors such as voltage output and capacity, which may be measured in ampere-hours, Ah, and size to meet the power requirements of each component effectively. In the transmitter unit 106, battery 122 may serve as a portable power source, enabling the generation and transmission of RF signals without requiring a direct connection to an external power supply. The battery 122 powers components such as the oscillator circuit 108, SCR 114, and transformer 116, ensuring continuous operation in various environmental conditions. In some embodiments, the battery 122 used may include lithium-ion, nickel-metal hydride, or other types suitable for portable electronic devices.

Further, embodiments may include a receiver unit 124, which may include the electronic circuit 128. Voltage from the receiver antenna 126 passes through a 10 K gain pot to an NPN transistor 130 used as a common emitter. The output is capacitively coupled to a PNP Darlington transistor 132. A plurality of resistors and capacitors fills in the circuit 128. The output is fed through an RPN 134 to a 555 timer that is used as a voltage-controlled oscillator. A received signal of a given amplitude generates an audible tone at a given frequency. In some embodiments, the output is fed to a tone generator, such as a speaker, via a standard 386 audio amp. Sounds can be categorized as "grunts," "whines," and a particular form of whine with a higher harmonic notably present. In some embodiments, another indicator of a received signal is used, such as light, vibration, digital display, or analog display, in alternative to or in combination with the sound signal. A battery may be used to power the receiver circuit 128. The receiver circuit 128 may utilize a coherent, direct-conversion mixer, homodyne, with RF gain, yielding a baseband signal centered about DC. After a baseband gain stage, the baseband signal is fed to another timing circuit that functions as a voltage-controlled audio-frequency oscillator. The output of this oscillator is amplified and fed to a speaker. In some embodiments, one or more portions of the receiver unit 124 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a receiver antenna 126, which may be a device that captures the radio frequency, RF, signals reflected from a target material. The receiver antenna 126 may be designed to efficiently receive the reflected RF signals and transmit them to the receiver unit 124 for further processing and analysis. The receiver antenna 126 may be responsible for capturing the RF signals that have interacted with the target material. In some embodiments, the receiver antenna 126 may be designed to operate within the same frequency range as the transmitter antenna 120 to ensure compatibility and optimal performance for detecting the atomic structures and characteristics of the target materials. In some embodiments, the sensitivity may be a measurement of the receiver antenna's 126 ability to detect weak signals. A highly sensitive receiver antenna 126 may detect low-power reflected signals, enhancing the system's detection capabilities. In some embodiments, the noise figure of the receiver antenna 126 may indicate the level of noise it introduces into the received signal. A lower noise figure may be desirable as it ensures that the captured signals are as clean and strong as possible for accurate processing. In some embodiments, proper impedance matching between the receiver antenna 126 and the receiver unit 124 may minimize signal response and maximize the power transfer from the receiver antenna 126 to the processing unit to ensure efficient and accurate signal reception. In some embodiments, the directional properties of the receiver antenna 126 may determine its ability to capture signals from specific directions to distinguish signals reflected from the target material versus other sources of interference. In some embodiments, the gain of the receiver antenna 126 may enhance its ability to receive signals from distant targets. The higher gain transmitter antenna 120 can improve the system's ability to detect materials at greater distances. In some embodiments, the physical design of the receiver antenna 126 may include various configurations such as dipole, patch, or parabolic receiver antenna 126 and may be based on factors such as frequency range, gain, and specific detection requirements. In some embodiments, the receiver antenna 126 may be integrated with the receiver unit 124 and other system components through connectors and mounting structures to ensure stable and reliable operation, with considerations for minimizing interference and signal loss. In some embodiments, the receiver antenna 126 and the transmitter antenna 120 may be a single antenna used by the RF detection device 102.

Further, embodiments may include a circuit 128 within the receiver unit 124, which may be an assembly of electrical components designed to process the received RF signal. The circuit 128 may accurately interpret the RF signals reflected or emitted from the target substances and convert them into data that can be analyzed by the RF detection device 102. The circuit 128 in the receiver unit 124 may be employed to handle signal amplification, filtering, demodulation, and signal processing. When an RF signal is received via the receiver antenna 126, it is typically weak and may contain noise or interference. The first stage of the circuit 128 may involve an amplifier that boosts the signal strength to a level suitable for further processing. This amplification ensures that even weak signals can be analyzed effectively. Next, the circuit 128 may include filtering components that serve to remove unwanted frequencies and noise from the received signal. Filters ensure that only the relevant frequency components of the RF signal are passed through, enhancing the signal-to-noise ratio and improving the clarity of the data. The circuit 128 may also incorporate a demodulator, which extracts the original information-bearing signal from the modulated RF carrier wave. This step interprets the data encoded in the RF signal, allowing the system to identify specific characteristics or signatures of the target substances. In some embodiments, the circuit 128 may include various signal processing components, such as analog-to-digital converters and ADCs, which convert the analog RF signal into digital data. This digital data may then be processed by the control panel 146 or other computational units within the system for detailed analysis. The signal processing may involve algorithms to detect specific patterns, frequencies, or anomalies that indicate the presence of target materials. The components within the circuit 128 interact seamlessly to ensure accurate and efficient signal processing. For example, the amplified signal from the amplifier is passed to the filter, which cleans up the signal before it reaches the demodulator. The demodulated signal is then digitized by the ADC and sent to the control panel 146 for analysis.

Further, embodiments may include an NPN transistor 130, which may be a three-terminal semiconductor device used for amplification and switching of electrical signals. The NPN transistor 130 may consist of three layers of semiconductor material: a thin middle layer, or base, between two heavily doped layers, or emitter and collector. The NPN transistor operates by controlling the flow of current from the collector to the emitter, regulated by the voltage applied to the base terminal. The NPN transistor 130 integrated into the receiver unit 124 may be designed to process incoming RF signals and may operate in a configuration where the base-emitter junction is forward-biased by a small control voltage provided by the preceding stages of the circuit. The collector of the NPN transistor 130 may be connected to the circuit's supply voltage through a load resistor. When a small current flows into the base terminal, it allows a larger current to flow from the collector to the emitter. This amplification process increases the strength of the received signal, enabling subsequent stages of the circuit to process it more effectively. In the receiver unit 124, the NPN transistor 130 may be employed within amplifier stages where signal gain is beneficial. By controlling the base current, the circuit can modulate the transistor's conductivity and thereby regulate the amplification factor. This capability enhances weak RF signals received by the receiver antenna 126 and prepares them for further processing. In some embodiments, the NPN transistor 130 may be utilized in conjunction with capacitors and resistors to form amplifier circuits tailored to the specific requirements of the RF detection device 102. Capacitors may be used to couple AC signals while blocking DC components, ensuring that only the RF signal is amplified. Resistors set the biasing and operating points of the transistor, optimizing its performance within the circuit.

Further, embodiments may include a PNP Darlington transistor 132, which may be a semiconductor device consisting of two PNP transistors connected in a configuration that provides high current gain. The PNP Darlington transistor 132 integrates two stages of amplification in a single package, where the output of the first transistor acts as the input to the second, significantly boosting the overall gain of the circuit. The PNP Darlington transistor 132 amplifies weak RF signals received by the receiver antenna 126. The incoming RF signal is fed into the base of the first PNP transistor within the Darlington pair. The PNP Darlington transistor 132, due to its high current gain, allows a much larger current to flow from its collector to the emitter compared to the base current. The output from the collector of the first transistor serves as the input to the base of the second PNP transistor in the Darlington pair. The second PNP transistor further amplifies the signal received from the first stage, again with significant current gain.

Further, embodiments may include an RPN 134 or resistor potentiometer network, which may be an electrical circuit composed of resistors and potentiometers interconnected in a specific configuration to achieve desired electrical characteristics, such as voltage division, signal attenuation, or adjustment of resistance values. Potentiometers, also known as variable resistors, allow for manual adjustment of resistance within the circuit, while resistors set fixed values to control current flow and voltage levels. The RPN 134 in the receiver unit 124 may be configured to adjust signal levels received from the receiver antenna 126 and prepare them for further processing. This network consists of resistors and potentiometers connected to achieve precise voltage division and attenuation. By adjusting the potentiometers, operators can fine-tune the signal strength and impedance matching, optimizing signal quality for subsequent stages of signal processing. The RPN 134 ensures that incoming RF signals from the receiver antenna 126 are properly attenuated and scaled to match the input requirements of downstream electronics. This calibration process maintains signal integrity and fidelity throughout the reception and decoding process. In some embodiments, the potentiometers within the RPN 134 may allow for manual adjustment of signal parameters such as amplitude and impedance, enabling operators to optimize signal reception based on environmental conditions and operational requirements.

Further, embodiments may include a tone generator 136, which may be a type of electronic device that produces audio signals or tones to alert the user of specific conditions. The tone generator 136 within the receiver unit 124 is utilized to generate audible alerts when the detection system identifies the presence of target materials. The tone generator 136 in the receiver unit 124 may be employed to create specific tones that serve as audible indicators for the user. By generating these tones, the tone generator 136 provides immediate feedback to the operator, signaling the detection of target materials in real-time. The tone generator 136 may ensure that the operator is promptly informed of detections without needing to constantly monitor visual displays. The tone generator 136 produces distinct sounds that correspond to different detection events, making it easier for the operator to understand the system's status and respond accordingly. The tone generator 136 may act as a critical alerting component within the receiver unit 124. When the control panel 146 determines that the RF signal corresponds to a detected target material, it sends a signal to the tone generator 136. This triggers the tone generator 136 to produce a sound, alerting the operator to the detection event.

Further, embodiments may include an audio amplifier 138, which may be a type of electronic device designed to increase the amplitude of audio signals. The audio amplifier 138 within the receiver unit 124 may be utilized to boost the audio signals generated by the tone generator 136, ensuring that the output sound is sufficiently loud and clear for the operator to hear. The audio amplifier 138 in the receiver unit 124 may be employed to enhance the volume and clarity of the audio tones produced by the tone generator 136. By amplifying these audio signals, the audio amplifier 138 ensures that the operator receives audible alerts even in noisy environments, thus improving the overall effectiveness of the detection system. The audio amplifier 138 may act as an intermediary component between the tone generator 136 and the output device, such as a speaker. When the tone generator 136 produces an audio signal, this signal is sent to the audio amplifier 138. The amplifier then boosts the signal's power, making it strong enough to drive the speaker and produce an audible sound. The audio amplifier 138 is connected to other components within the receiver unit 124, including the tone generator 136 and the speaker. It receives the low-power audio signals from the tone generator 136 and amplifies them to a level suitable for driving the speaker.

Further, embodiments may include a battery 140, which may be a type of energy storage device that provides a stable and portable power source for the receiver unit 124. The battery 140 within the receiver unit 124 may be utilized to supply the electrical energy to the various components involved in generating and transmitting the RF signal. The battery 140 may be designed to store electrical energy and supply it to the respective components as required. The battery 140 may be rechargeable or replaceable cells capable of providing DC voltage. They are selected based on factors such as voltage output and capacity, which may be measured in ampere-hours, Ah, and size to meet the power requirements of each component effectively. In the receiver unit 124, batteries provide the electrical energy to receive and process RF signals detected by the receiver antenna 126. The battery 140 may power components such as amplifiers, filters, and signal processing circuitry, enabling the device to analyze incoming RF signals and extract relevant information. In some embodiments, the battery 140 used may include lithium-ion, nickel-metal hydride, or other types suitable for portable electronic devices.

Further, embodiments may include a directional shield 142, which may be a physical barrier or enclosure designed to direct or block electromagnetic radiation in a specific direction. The directional shield 142 may be constructed from conductive materials such as metal to attenuate or reflect RF signals, thereby controlling the propagation of electromagnetic waves. The directional shield 142 may be positioned around the RF oscillator and antenna 120 126 components and may act as a physical barrier that prevents RF signals from propagating in undesired directions, thereby enhancing the precision and accuracy of signal transmission and reception. During operation, when the transmitter unit 106 generates an RF signal, the directional shield 142 helps to focus and channel this signal towards the intended detection area. By reducing signal dispersion and reflection, the directional shield 142 improves the efficiency of signal transmission and enhances the system's overall sensitivity to detecting RF reflections from underground objects or materials.

Further, embodiments may include a power supply 144, such as batteries serving as the power source for specific components within the RF detection device 102, including the control panel 146. These batteries are designed to store electrical energy and supply it to the respective components as required. The batteries in the control panel 146 may be rechargeable or replaceable cells capable of providing DC voltage. They are selected based on factors such as voltage output and capacity, which may be measured in ampere-hours, Ah, and size to meet the power requirements of each component effectively. In some embodiments, the control panel 146 relies on batteries to maintain functionality for user interface operations, data processing, and communication with other parts of the RF detection device 102. The batteries in the control panel 146 ensure that they remain operational during field use, supporting tasks such as signal monitoring, parameter adjustment, and data transmission. In some embodiments, the batteries used in these components may include lithium-ion, nickel-metal hydride, or other types suitable for portable electronic devices. They are integrated into the design to provide sufficient power capacity and longevity, allowing the RF detection device 102 to operate autonomously for extended periods between recharges or battery replacements.

Further, embodiments may include a control panel 146, which may be a centralized interface comprising electronic controls and displays. The control panel 146 may serve as the user-accessible interface for configuring, monitoring, and managing the RF detection device's 102 operational parameters and data output. In some embodiments, the control panel 146 may be designed to provide operators with intuitive access to control and monitor various aspects of the RF detection device 102. The control panel 146 may allow for the configuration of settings such as signal frequency, transmission power, receiver sensitivity, and signal processing algorithms. In some embodiments, operators may use the control panel 146 to initiate and terminate detection operations, adjust calibration settings, and troubleshoot operational issues. In some embodiments, the control panel 146 may include a graphical display screen or LED indicators to present real-time status information and measurement results. In some embodiments, input controls such as buttons, knobs, or touch-sensitive panels may enable operators to interact with the device, input commands, and navigate through menu options. The control panel 146 may interface directly with the internal electronics of the RF detection device 102, including the transmitter unit 106, receiver unit 124, antennas 120 126, and signal processing circuitry. Through electronic connections and communication protocols, the control panel 146 may send commands to adjust operational parameters and receive feedback and status updates from the device. In some embodiments, the control panel 146 may be mounted on the support frame 104 and may provide an operator with control of the RF detection device 102, including adjusting various settings and signaling the operator of a detected material. In some embodiments, a rechargeable battery may power the RF detection device 102, including the transmitter unit 106, the receiver unit 124, and the control panel 146. In some embodiments, multiple batteries may be used. In some embodiments, a tone generator, such as a speaker, may be mounted to the support frame 104 to provide audible signals to the operator for detecting target materials.

Further, embodiments may include a communication interface 148, which may be a hardware and software solution that enables data exchange between different systems or components within a network. The communication interface 148 may act as a bridge, facilitating the transfer of information by converting data into a format that can be transmitted and received by different devices. In some embodiments, the communication interface 148 may support various protocols and standards, such as Ethernet, Wi-Fi, Bluetooth, USB, and others, depending on the application requirements. For example, an Ethernet interface may be used for wired network connections, providing reliable and high-speed data transfer. In some embodiments, a Wi-Fi interface may enable wireless connectivity, allowing the device to communicate with remote servers, mobile devices, or cloud-based applications without physical cables. In some embodiments, Bluetooth and USB interfaces may also be included for short-range wireless communication and direct data transfer, respectively. The communication interface 148 may transmit the processed data from the DSP to external systems for further analysis, reporting, or storage. After the DSP processes the signals received from the ADC and extracts meaningful information about the target materials, the control panel 146 may package this data into suitable formats, such as JSON or XML. The communication interface 148 may then send this data over the network to a remote server or database, where it can be accessed by operators, analysts, or automated systems for further decision-making. In some embodiments, the communication interface 148 may provide remote monitoring and control of the RF detection device 102. Operators may use a web-based interface or a mobile application to access real-time status updates, view detection logs, and adjust configuration settings. For example, if the RF detection device 102 needs to be calibrated for a new target material, the configuration updates can be sent remotely through the communication interface, minimizing the need for on-site adjustments. In some embodiments, the communication interface 148 may support alerting and notification functionalities. When the control panel 146 detects the presence of hazardous materials, it can use the communication interface 148 to send immediate alerts to designated personnel via email, SMS, or push notifications.

Further, embodiments may include a memory 150, which may include suitable logic, circuitry, and/or interfaces that may be configured to store a machine code and/or a computer program with at least one code section executable by the processor 152. Examples of implementation of the memory 150 may include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or another type of media/machinereadable medium suitable for storing electronic instructions. In some embodiments, the memory 150 may store configuration settings, signal patterns, and detection algorithms.

Further, embodiments may include a processor 152, which may be responsible for executing instructions from programs and controlling the operation of other hardware components. The processor 152 may perform basic arithmetic, logic, control, and input/output (I/O) operations specified by the instructions in the programs. The processor 152 may operate by fetching instructions from memory 150, decoding them to determine the required operation, executing the operations, and then storing the results. In some embodiments, the processor 152 may coordinate the overall system operations, manage communication between subsystems, and handle complex data analysis tasks that complement the real-time signal processing performed by the DSP. For example, when the RF detection device 102 is powered on, the processor 152 may initiate a boot-up sequence that includes running diagnostics to check the status of all subsystems, such as the transmitter unit 106, the receiver unit 124, and control panel 146. During this initialization phase, the processor 152 may ensure that each component receives the correct voltage and current levels required for operation. The processor 152 may also load predefined detection configurations and communicate with the transmitter unit 106 and receiver unit 124 to configure their operating parameters based on the target material. In some embodiments, the processor 152 may handle user interface tasks, displaying system status indicators and receiving user inputs. The processor 152 may ensure that the control panel 146 provides real-time feedback, such as green LED indicators for successful power-up and system readiness. In some embodiments, the processor 152 may manage data storage and logging, recording detection events and system performance metrics for future analysis.

Further, embodiments may include a base module 154, which begins with the system being activated, after which the user inputs the desired target material on the control panel 146. The base module 154 compares the inputted target material to the specific material database 164 and extracts the relevant RF data. This RF data is sent to the pulse module 156, which is then initiated. The base module 154 then initiates the power module 158, the sweep module 160, and the investigation module 162.

Further, embodiments may include a pulse module 156, which may be initiated by the base module 154 and begins by extracting the first pulse sequence from the pulse database 166. It configures and generates the transmit signal through the transmitter unit 106 and transmitter antenna 120. The pulse module 156 then checks if an RF signal is received by the receiver antenna 126. If an RF signal is received, the pulse module processes it through the receiver unit 124 and stores the processed data in the investigation database 172. Whether an RF signal is received or not, the pulse module checks if there are more pulse sequences in the pulse database. If there are, it extracts the next pulse sequence and repeats the process. If there are no more pulse sequences, the pulse module returns control to the base module 154.

Further, embodiments may include a power module 158, which may be initiated by the base module 154 and starts by extracting the first power level from the power database 168. It configures and generates the transmit signal through the transmitter unit 106 and transmitter antenna 120. The power module then checks if an RF signal is received by the receiver antenna 126. If an RF signal is received, it processes the signal through the receiver unit 124 and compares it to the response reference database 170. The processed power response data is then stored in the investigation database 172. Whether an RF signal is received or not, the power module checks if there are more power levels in the power database. If there are, it extracts the next power level and repeats the process. If there are no more power levels remaining, the power module returns control to the base module 154.

Further, embodiments may include a sweep module 160, which may be initiated by the base module 154 and begins by determining the frequency range for the target material or substance. It selects the first frequency from this range and configures the transmit signal through the transmitter unit 106 and transmitter antenna 120. The sweep module then checks if an RF signal is received by the receiver antenna 126. If a signal is received, the data is stored in the investigation database 172. Whether a signal is received or not, the sweep module checks if there are more frequencies remaining in the range. If there are, it selects the next frequency and repeats the process. If there are no more frequencies remaining, the sweep module returns control to the base module 154.

Further, embodiments may include an investigation module 162, which may be initiated by the base module 154 and begins by extracting data from the investigation database 172. It then determines the identified material based on this data and sends the identified material parameters to the control panel 146. The investigation module returns control to the base module 154.

Further, embodiments may include a specific material database 164, which may store and manage detailed information about various target materials. The specific material database 164 may be used to configure the detection parameters to identify specific materials based on their unique electromagnetic properties. Each entry in the database may be defined by the material's atomic structure, which includes the total number of protons and neutrons. The unique nuclear composition allows each substance to be distinctly identifiable and detectable through its resonant frequency. The specific material database 164 may contain a unique Material ID, the common name of the material, the number of protons, the number of neutrons, and the atomic mass, which is the sum of protons and neutrons. The specific material database 164 may also contain calculated resonant frequencies based on the atomic characteristics. The resonant frequencies are critical for configuring the transmitter unit of the RF detection device 102, which sends out signals at these specific frequencies to induce a resonant response in the target material. For example, the specific material database 164 may contain an entry for Arsenic (As) with 33 protons and 42 neutrons, resulting in an atomic mass of 75. The resonant frequencies for Arsenic could be 33 Hz, based on the number of protons, 42 Hz, based on the number of neutrons, and 75 Hz, based on the atomic mass. These frequencies may also be increased by orders of magnitude, such as 10× or 100×, to suit different detection environments. In some embodiments, for compounds, the specific material database 164 calculates a combined frequency based on the sum of the resonant frequencies of the constituent elements. For example, a Formaldehyde molecule, composed of 16 protons and 14 neutrons with a total atomic mass of 30, would have corresponding frequencies of 16 Hz, 14 Hz, and 30 Hz, respectively. Another example may be smokeless gunpowder, specifically nitroglycerin, with the chemical composition CH2NO3CHNO3CH2NO3. The frequency for this compound may be calculated by summing the frequencies based on the atomic numbers of its constituent elements: 6 carbon+1×2 hydrogen+7 nitrogen+8×3 oxygen, repeated thrice, resulting in a total of 116 protons. This is then multiplied by 10 to yield a base frequency of 1160 Hz for detection purposes. In some embodiments, the specific material database 164 may account for overlapping frequencies among different elements and compounds. To enhance the accuracy of detection, the system may employ multiple methods to calculate and verify the target material's frequency, such as using combinations of proton counts, neutron counts, and atomic masses, which allows the system to distinguish between materials with similar frequencies by leveraging the unique resonant properties of each substance.

Further, embodiments may include a pulse database 166, which may be previously created or previously stored database on the RF detection device 102 that contains a plurality of pulse sequences that transmit the target material frequency in the process described in the pulse module 156. The pulse database 166 may contain a pulse ID, the pulse duration, such as in milliseconds, the pulse interval, the pulse count, etc. In some embodiments, the pulse ID may be a unique identifier for each pulse sequence. In some embodiments, the pulse duration may be the duration of each pulse in milliseconds and may range from very short pulses, such as one millisecond, to continuous or constant signals. In some embodiments, the pulse interval may be the interval between consecutive pulses. In some embodiments, the pulse count may be the number of pulses in a sequence. The pulse database 166 may be used to determine if a target material is identified by transmitting the frequency of the target material from a very short pulse to a constant signal and determining if a response signal is received by the receiver antenna 126 between each pulse sequence.

Further, embodiments may include a power database 168, which contains various power levels that the signal is transmitted by the RF detection device 102 through the power module 158, and the response signal is then compared to the response reference database 170, which may determine the quantity or distance of the target material. The power database 168 may contain a power level ID, the power, the amplitude, etc. In some embodiments, the power level ID may be a unique identifier for each power level entry. In some embodiments, the power may be the power level of the transmitted signal in watts. In some embodiments, the amplitude may be the amplitude or strength of the transmitted signal corresponding to the power level. The data entries in the power database 168 may be extracted and transmitted starting from a very low power level to a very high power level through the process described in the power module 158. By varying the power levels and determining if the receiver antenna 126 received a response signal from the target material, the power module 158 may be able to determine the quantity or distance of the target material from the RF detection device 102.

Further, embodiments may include a response reference database 170, which may contain pre-calibrated response curves that relate transmitted power levels to received response signal strengths for various known quantities and distances of a target material. The response reference database 170 may contain the target material, the quantity, the distance, and the response signal at the various power levels in decibels. In some embodiments, the response reference database 170 may contain a plurality of target materials that have corresponding response curves, as the response signal from each target material may vary. In some embodiments, the quantity may be the known quantity of the target material. In some embodiments, the distance may be the known distance of the target material. In some embodiments, the response signal at various power levels in decibels may be the strength of the signal received at each specified power level. In some embodiments, the known quantity and distance of the target material may be determined by analyzing historical data of the target material. For example, the historical data may include previous transmissions, such as the various power levels, and responses, such as response signal strength in decibels, for uranium that may be used to determine the quantity or distance. If there is 0.5 kg of uranium at 10 meters, the response signal strength may be −80 dB at power level 1, −70 dB at power level 2, −65 dB at power level 3, and −60 dB at power level 4. If there is 1 kg of uranium at 20 meters, the response signal strength may be −85 dB at power level 1, −75 dB at power level 2, −70 dB at power level 3, and −65 dB at power level 4. For future analysis, the response reference database 170 may be used to determine the quantity or distance for the target material, such as sending a transmission signal at power level 4 for uranium and the response signal strength is −65 dB, it may be determined that the 0.5 kg of uranium is 10 meters away or 1 kg of uranium is 20 meters away. In some embodiments, the response reference database 170 may be used to collect a plurality of response signal strengths, which may be further analyzed to determine the most likely quantity and distance of the target material.

Further, embodiments may include an investigation database 170, which may contain processed data from the pulse module 156, power module 158, and the sweep module 160 and may be used by the investigation module 162 to enhance the way in which the target material is detected. In some embodiments, the investigation database 170 may contain data from the pulse module 156, such as the pulse sequence IDs, received signal strengths from each pulse sequence, processed data, characteristics identified in the signals, etc. In some embodiments, the investigation database 170 may contain data from the power module 158, such as the target material quantities and distance data entries from the response reference database 170 that match the response signal strength. For example, the power module 158 may store the data entry from the response reference database 170 of 0.5 kg of uranium at 10 meters, 1 kg of uranium at 20 meters, etc. In some embodiments, the investigation database 170 may contain data from the sweep module 160, such as the transmitted frequency and the response signal that was received by the receiver unit 124 via the receiver antenna 126. In some embodiments, the pulse module 156 data may capture the raw and processed signal data for each pulse sequence, allowing for detailed analysis of signal characteristics and identification of target materials, and the presence or absence of a response signal is recorded to help refine detection accuracy. In some embodiments, the power module 158 data may store potential matches for target material quantities and distances based on the received signal strength at various power levels, which may help in correlating the observed signal patterns with known reference data, facilitating the determination of the most likely target material scenario. In some embodiments, the sweep module 160 may record the transmitted frequencies and corresponding response signals, enabling the differentiation between target materials and other materials with similar frequencies, which may be used to fine-tune the detection process and improve accuracy.

Further, embodiments may include a cloud 174, or communication network, which may be a wired and/or wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet, and relies on the sharing of resources to achieve coherence and economies of scale, like a public utility, while third-party clouds 174 enable organizations to focus on their core businesses instead of expending resources on computer infrastructure and maintenance.

Further, embodiments may include a network 176, which may be a collection of interconnected devices that communicate with each other to share resources, data, and applications. In some embodiments, the network 176 may utilize various protocols, such as TCP/IP, to ensure data is transmitted accurately and efficiently. In some embodiments, the network 176 may transmit the processed data from the DSP to user devices, allowing operators to view and analyze the data collected. The network 176 may be designed to support real-time data transmission, remote monitoring, and analysis functionalities, ensuring that the system operates efficiently and effectively. Upon receiving the processed signals from the DSP, the control panel 146 may package the data into standardized formats such as JSON or XML, making it suitable for transmission over the network 176. In some embodiments, the network 176 setup may involve an Ethernet or Wi-Fi interface integrated into the control panel 146, which establishes a connection to the local network or the internet. For example, when the control panel 146 detects the presence of target materials, it sends the relevant data to the server or cloud platform via the network 176. The data is then processed and stored, allowing operators to access it through their user devices. For example, if the RF detection device 102 identifies a hazardous material, the data is immediately transmitted to the cloud platform, where it triggers alerts and notifications to the operators' devices. Operators can then log into the platform, view detailed reports, and analyze the data to make informed decisions.

In another embodiment, a material detection system uses a hybrid antenna that can operate both in RF-based and magnetic-based detection modes. This system is capable of switching between detecting materials based on their interaction with the RF field or the magnetic field, depending on the material being analyzed. In RF mode, the antenna transmits RF waves, and the system analyzes how the material reflects or absorbs these waves, providing information based on the dielectric constant or conductive properties of the material. In magnetic mode, the antenna focuses on the interaction between the material and the magnetic field component of the electromagnetic wave, allowing detection of materials with high magnetic permeability or strong magnetic responses. For example, the system could be used to detect metallic substances or magnetic compounds, such as those found in explosive materials, by optimizing the detection process based on which field interaction yields the clearest signature.

In yet another embodiment, a near-field material detection system uses a magnetic-based loop antenna that focuses on magnetic field interaction within close proximity to the target material. This system uses magnetic resonance principles, detecting changes in the magnetic field due to interactions with materials possessing magnetic susceptibility, such as ferromagnetic metals. The loop antenna generates a localized oscillating magnetic field, and when materials are introduced into the detection zone, they alter the field by inducing eddy currents or magnetic resonance effects. These changes are then measured to determine the material's properties. This method is particularly useful in applications such as industrial quality control or close-range security screening, where detecting the magnetic characteristics of a material offers clear advantages.

In still another embodiment, far-field magnetic resonance techniques are employed for material detection at greater distances. This system operates by transmitting an electromagnetic wave where the magnetic field component is emphasized, focusing on its interaction with materials that have resonant magnetic properties. By tuning the system to specific resonant frequencies, materials that exhibit strong magnetic responses, such as certain alloys or ferromagnetic materials, can be detected over a larger range. The detection system then analyzes the phase or amplitude of the reflected wave to infer material characteristics. This embodiment is particularly suitable for remote sensing applications, such as geological surveys, where materials can be identified based on their magnetic resonance even when located at a distance from the detection apparatus.

In other embodiments, an array of antennas is used to simultaneously detect materials based on both RF and magnetic field interactions. The antenna array consists of dipole antennas optimized for detecting the electric component of the RF wave and loop antennas that focus on the magnetic field interaction. These two types of signals are combined to create a composite material signature, allowing for detailed analysis of both the dielectric and magnetic properties of the material. By processing both electric and magnetic field data, the system can more accurately identify materials that exhibit a combination of electrical conductivity and magnetic permeability, such as advanced composites or stealth materials. This dual-mode system can be particularly useful in defense or aerospace applications.

In still other embodiments, a magnetic-based antenna system is designed for material detection in environments where RF signals would typically be degraded, such as underground or underwater. This system uses a loop antenna to generate a magnetic field that interacts with materials possessing strong magnetic properties, even in situations where RF signals are heavily attenuated. The antenna detects variations in the magnetic field caused by materials with high permeability, such as iron or nickel-based substances. This method allows for the detection of magnetic materials in conditions where RF detection would be unreliable, such as in deep-sea exploration or subterranean mining operations, where conventional RF signals would fail to penetrate effectively.

In further embodiments, a phased array system is designed specifically to manipulate the magnetic component of the electromagnetic wave for high-resolution material detection. A phased array of loop antennas is used to steer and focus the magnetic field, creating a directed magnetic beam that can scan across a target area. The system detects materials based on how they alter the magnetic field, allowing for precise location and identification of magnetic objects. By adjusting the phase and amplitude of each antenna element, the system provides a fine degree of control, enabling highly localized material detection. This approach is useful in situations requiring detailed spatial resolution, such as identifying hidden metallic objects in security screening or detailed inspections in industrial settings.

In additional embodiments, a portable or wearable material detection system is implemented using a small, magnetic-based loop antenna for detecting magnetic materials in close proximity. This compact system allows security personnel or industrial workers to move through different environments while continuously monitoring for materials that exhibit magnetic properties. The loop antenna generates a localized magnetic field and detects perturbations caused by nearby magnetic materials, such as concealed weapons or magnetic tags. The system then alerts the user when such materials are detected, making it ideal for field operations where mobility and ease of use are critical.

In yet another embodiment, the material detection system is entirely RF-based, using a highly optimized RF antenna to detect materials based solely on their interaction with the RF field. The RF antenna transmits electromagnetic waves at specific frequencies, and the system analyzes how these waves are reflected, absorbed, or scattered by the material. By focusing on the dielectric constant or conductive properties of the target material, the system can accurately identify substances such as explosives, chemicals, or other dielectric materials. This approach is particularly effective in environments where magnetic field-based detection may be less effective. The RF-based system can be adapted for wide-ranging applications, from industrial material testing to security scanning, where detecting the electrical characteristics of the material is sufficient for identification.

Figure 2:
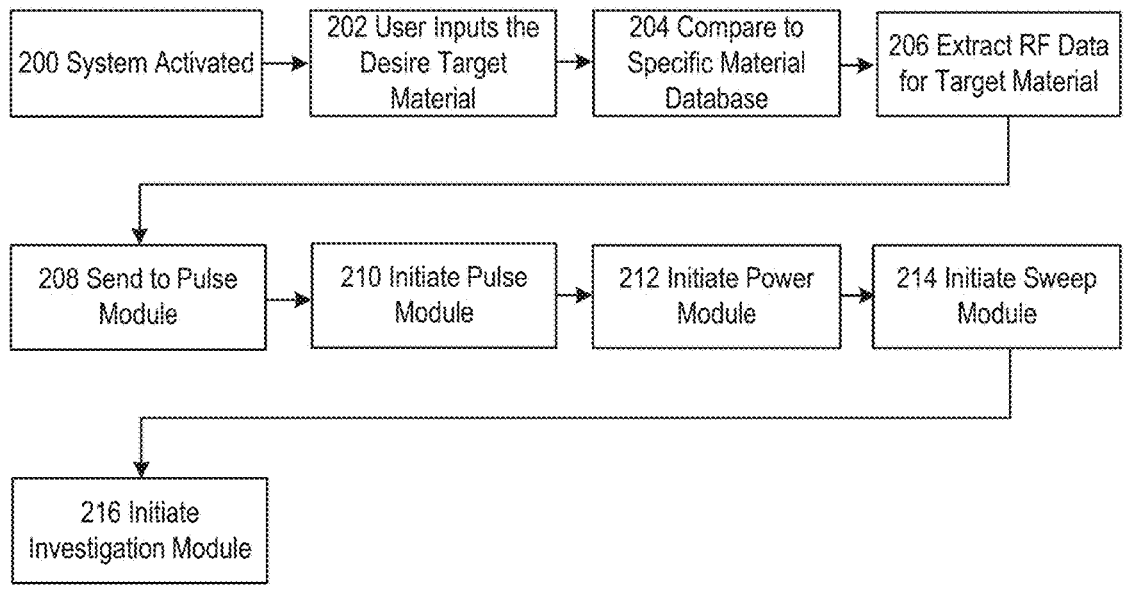
FIG. 2 is a flow chart of a method performed by a Base Module, according to an embodiment.

FIG. 2 illustrates the base module 154. The process begins with the system being activated at step 200. The user or operator may power on the RF detection device 102. The user inputs, at step 202, the desired target material on the control panel 146. In some embodiments, the control panel 146 may display the specific material database 164, allowing them to select the target material, such as an element on the periodic table or a compound to search for. In some embodiments, the specific material database 164 may be application-specific, such as a database for medical applications, a database for security applications, including military bases or airports, a database for biohazardous materials, etc. The base module 154 compares, at step 204, the inputted target material to the specific material database 164. The specific material database 164 may store and manage detailed information about various target materials. The specific material database 164 may be used to configure the detection parameters to identify specific materials based on their unique electromagnetic properties. Each entry in the database may be defined by the material's atomic structure, which includes the total number of protons and neutrons. The unique nuclear composition allows each substance to be distinctly identifiable and detectable through its resonant frequency. The specific material database 164 may contain a unique Material ID, the common name of the material, the number of protons, the number of neutrons, and the atomic mass, which is the sum of protons and neutrons. The specific material database 164 may also contain calculated resonant frequencies based on the atomic characteristics. The resonant frequencies are critical for configuring the transmitter unit of the RF detection device 102, which sends out signals at these specific frequencies to induce a resonant response in the target material. For example, the specific material database 164 may contain an entry for Arsenic (As) with 33 protons and 42 neutrons, resulting in an atomic mass of 75. The resonant frequencies for Arsenic could be 33 Hz, based on the number of protons, 42 Hz, based on the number of neutrons, and 75 Hz, based on the atomic mass. These frequencies may also be increased by orders of magnitude, such as 10× or 100×, to suit different detection environments. In some embodiments, for compounds, the specific material database 164 calculates a combined frequency based on the sum of the resonant frequencies of the constituent elements. For example, a Formaldehyde molecule, composed of 16 protons and 14 neutrons with a total atomic mass of 30, would have corresponding frequencies of 16 Hz, 14 Hz, and 30 Hz, respectively. Another example may be smokeless gunpowder, specifically nitroglycerin, with the chemical composition CH2NO3CHNO3CH2NO3. The frequency for this compound may be calculated by summing the frequencies based on the atomic numbers of its constituent elements: 6 carbon+1×2 hydrogen+7 nitrogen+8×3 oxygen, repeated thrice, resulting in a total of 116 protons. This is then multiplied by 10 to yield a base frequency of 1160 Hz for detection purposes. In some embodiments, the specific material database 164 may account for overlapping frequencies among different elements and compounds. To enhance the accuracy of detection, the system may employ multiple methods to calculate and verify the target material's frequency, such as using combinations of proton counts, neutron counts, and atomic masses, which allows the system to distinguish between materials with similar frequencies by leveraging the unique resonant properties of each substance. The base module 154 extracts, at step 206, the RF data for the target material from the specific material database 164. In some embodiments, the base module 154 may extract the frequency that is for the specific target material inputted or selected by the user on the control panel 146. In some embodiments, the user may select multiple or a plurality of target materials to search for. The base module 154 sends, at step 208, the RF data to the pulse module 156. In some embodiments, the base module 154 may send the frequency for the target material to the power module 158 and the sweep module 160. The base module 154 initiates, at step 210, the pulse module 156. The pulse module 156 is initiated by the base module 154 and begins by extracting the first pulse sequence from the pulse database 166. It configures and generates the transmit signal through the transmitter unit 106 and transmitter antenna 120. The pulse module 156 then checks if an RF signal is received by the receiver antenna 126. If an RF signal is received, the pulse module processes it through the receiver unit 124 and stores the processed data in the investigation database 172. Whether an RF signal is received or not, the pulse module checks if there are more pulse sequences in the pulse database. If there are, it extracts the next pulse sequence and repeats the process. If there are no more pulse sequences, the pulse module returns control to the base module 154. The base module 154 initiates, at step 212, the power module 158. The power module 158 is initiated by the base module 154 and starts by extracting the first power level from the power database 168. It configures and generates the transmit signal through the transmitter unit 106 and transmitter antenna 120. The power module then checks if an RF signal is received by the receiver antenna 126. If an RF signal is received, it processes the signal through the receiver unit 124 and compares it to the response reference database 170. The processed power response data is then stored in the investigation database 172. Whether an RF signal is received or not, the power module checks if there are more power levels in the power database. If there are, it extracts the next power level and repeats the process. If there are no more power levels remaining, the power module returns control to the base module 154. The base module 154 initiates, at step 214, the sweep module 160. The sweep module 160 may be initiated by the base module 154 and begins by determining the frequency range for the target material or substance. It selects the first frequency from this range and configures the transmit signal through the transmitter unit 106 and transmitter antenna 120. The sweep module then checks if an RF signal is received by the receiver antenna 126. If a signal is received, the data is stored in the investigation database 172. Whether a signal is received or not, the sweep module checks if there are more frequencies remaining in the range. If there are, it selects the next frequency and repeats the process. If there are no more frequencies remaining, the sweep module returns control to the base module 154. The base module initiates, at step 216, the investigation module 162. The investigation module 162 may be initiated by the base module 154 and begins by extracting data from the investigation database 172. It then determines the identified material based on this data and sends the identified material parameters to the control panel 146. The investigation module returns control to the base module 154.

Figure 3:
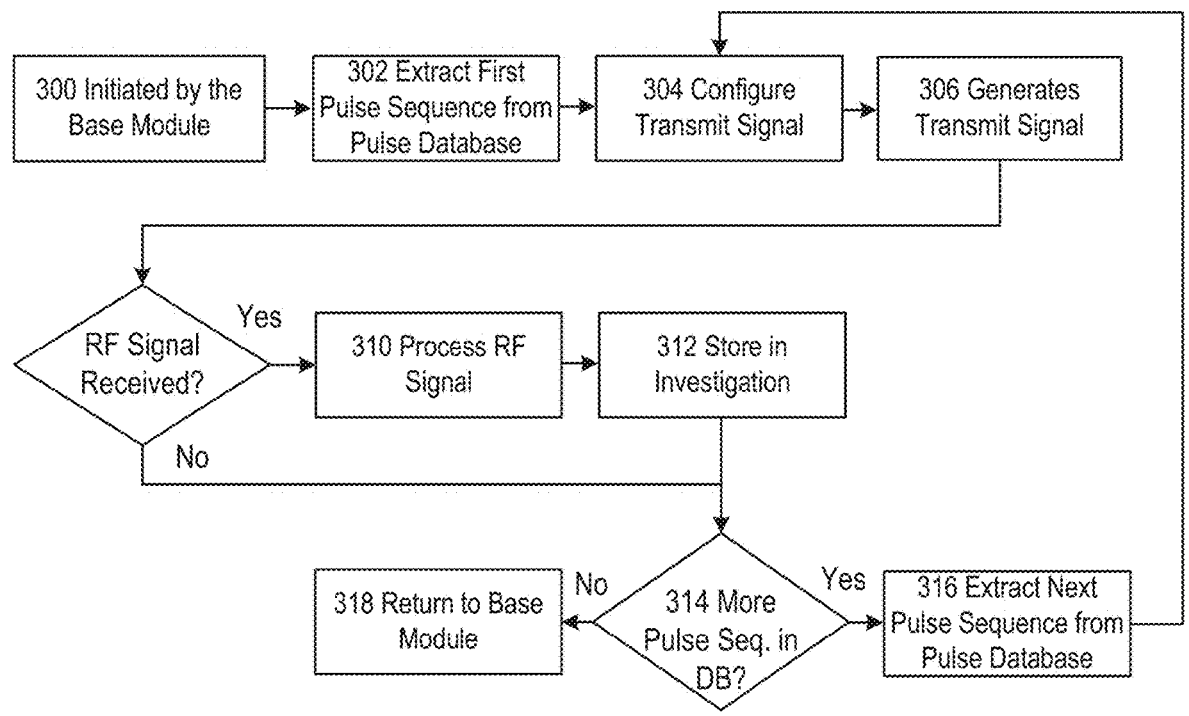
FIG. 3 is a flow chart of a method performed by a Pulse Module, according to an embodiment.

FIG. 3 illustrates the pulse module 156. The process begins with the pulse module 156 being initiated, at step 300, by the base module 154. The pulse module 156 may receive the transmission frequency for the target material from the base module 154. The pulse module 156 extracts, at step 302, the first pulse sequence from the pulse database 166. The pulse database 166 may be previously created or previously stored database on the RF detection device 102 that contains a plurality of pulse sequences that transmit the target material frequency in the process described in the pulse module 156. The pulse database 166 may contain a pulse ID, the pulse duration, such as in milliseconds, the pulse interval, the pulse count, etc. In some embodiments, the pulse ID may be a unique identifier for each pulse sequence. In some embodiments, the pulse duration may be the duration of each pulse in milliseconds and may range from very short pulses, such as one millisecond, to continuous or constant signals. In some embodiments, the pulse interval may be the interval between consecutive pulses. In some embodiments, the pulse count may be the number of pulses in a sequence.

At step 302, the first pulse sequence is retrieved from the pulse database 166. The pulse database 166 may be a pre-created or pre-stored database on the RF detection device 102, containing a variety of pulse sequences used for transmitting target material frequencies as described in the pulse module 156. Each entry in the pulse database 166 includes a pulse ID, the pulse duration, pulse interval, pulse count, and other relevant parameters.

The pulse ID serves as a unique identifier for each pulse sequence. The pulse duration, measured in milliseconds, specifies the length of each pulse. These durations can range from very short pulses, such as 10 milliseconds, to much longer pulses extending to seconds. The pulse interval indicates the delay between consecutive pulses, which can vary from 10 milliseconds to several hundred milliseconds. The pulse count represents the total number of pulses in a sequence.

For each material stored in the database, there is a calculated frequency associated with it. The database includes detailed pulse sequences where the frequency, duration, and intervals are varied. For example, a selected material might have a frequency transmitted for 10 milliseconds, followed by a 10-millisecond delay, then another pulse of 20 milliseconds, followed by another delay. The pulse sequences can further vary the frequency, the duration of each pulse, and the delays between them, creating a complex pattern to be transmitted to the transmitter.

In this way, the pulse database 166 ensures that the RF detection device 102 can dynamically transmit varied pulse sequences, optimizing the detection and identification of specific materials based on their unique frequency responses.

Varying the pulses and delays at a given frequency can significantly enhance the effectiveness of transmitting and receiving RF signals for material detection. There are several reasons for this approach.

In one embodiment there is a desire to enhance the Signal-to-Noise Ratio (SNR) Optimization. Different pulse durations and intervals can help identify the "sweet spot" where the signal-to-noise ratio is maximized. This is critical for distinguishing the target signal from background noise. By varying these parameters, the system can adapt to the optimal conditions for each material, enhancing detection accuracy.

In another embodiment there is a desire to enhance the Internal Device Noise Mitigation. The internal electronics of the detection device can introduce RF signal path noise. By varying the pulse sequences, the system can minimize the impact of this noise. Some pulse configurations may be less susceptible to internal noise, allowing for clearer signal reception.

In another embodiment there is a desire to enhance the Environmental Noise Adaptation. Environmental factors, such as electromagnetic interference from other devices, can affect signal clarity. Varying the pulse durations and delays can help the system adapt to fluctuating environmental conditions. Certain pulse patterns may perform better under specific noise conditions, improving the chances of accurate detection.

In another embodiment there is a desire to enhance the Enhanced Digital Signal Processing (DSP) Efficiency. DSP algorithms can be more effective with varied pulse sequences. Some pulse configurations might align better with the DSP filters and algorithms, allowing for more precise signal extraction and analysis. This can be particularly useful for distinguishing between similar materials.

In another embodiment there is a desire to enhance the Frequency-Specific Material Responses. Different materials may have unique resonant behaviors that are more pronounced with specific pulse durations and intervals. By varying these parameters, the system can better match the resonant characteristics of the target material, leading to more accurate identification.

In another embodiment, there is a desire to enhance the Multipath Propagation Effects. In complex environments, RF signals can reflect off various surfaces, creating multipath propagation. Varying the pulse sequences can help differentiate between direct signals and reflected signals, improving the accuracy of the material detection.

Overall, by dynamically adjusting the pulse durations and intervals, the system can fine-tune its performance to achieve better signal clarity, higher accuracy in material identification, and improved resilience to noise and interference. This approach allows for a more robust and adaptable RF detection system.

The pulse database 166 may be used to determine if a target material is identified by transmitting the frequency of the target material from a very short pulse to a constant signal and determining if a response signal is received by the receiver antenna 126 between each pulse sequence. The pulse module 156 configures, at step 304, the transmit signal through the transmitter unit 106. The transmitter unit 106 prepares the signal that will be transmitted to detect a target material. In some embodiments, the parameters and components may be set up with the desired characteristics to generate the RF signal. In some embodiments, the control panel 146 may determine the specific parameters of the RF signal that need to be generated, such as the frequency, amplitude, etc., required to effectively detect the target materials. The control panel 146 sends a command to activate the oscillator circuit within the transmitter unit 106. The oscillator circuit may be responsible for generating a stable RF signal at the desired frequency and may consist of components like capacitors, inductors, and amplifiers that work together to create the oscillating signal. The power delivery to the oscillator circuit may be managed by the SCR 114. When the control panel 146 sends a gate signal to the SCR 114, it switches from a non-conductive to a conductive state, allowing current from the power source, such as batteries, to flow to the oscillator circuit. After the oscillator circuit generates the RF signal, the transformer 116 adjusts the voltage level of the signal to match the requirements of the transmit antenna 120. It may also provide impedance matching to ensure efficient signal transmission. The transformer 116 ensures that the RF signal is at the appropriate voltage and current levels for optimal transmission. For example, the control panel 146 may determine that an RF signal with a frequency of 50 Hz is required to detect a specific material. It sends a command to the transmitter unit 106 to configure this signal. The oscillator circuit is activated, generating an RF signal at 50 Hz. The SCR 114 is triggered, allowing power from the batteries to flow to the oscillator circuit. The generated signal is then conditioned by the transformer 116, ensuring it is at the correct voltage level for transmission. The pulse module 156 generates, at step 306, the transmit signal through the transmitter unit 106 via the transmitter antenna 120. The transmitter unit 106 generates the RF signal and transmits it through the transmit antenna 120 by converting electrical energy into radio waves that can be used for detecting specific materials. The transmit antenna 120 radiates the RF signal into the environment. The radio waves propagate through the medium, such as air or ground, and interact with the target materials. The interaction between the RF signal and the target materials will produce detectable changes in the signal, which can be received and analyzed by the receiver unit 124. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 120 and the target. When the RF detection device 102 is aligned with a target material, for example, when the opening of the directional shield 142 is pointing toward the target material, the voltage produced by the receiver antenna 126 changes and thereby produces a detection output signal, such as an audio signal having a tone different than that of the baseline. A response wave is produced by the target material that amplifies, resonates, offsets, or otherwise modifies the magnetic field passing through the receiver antenna 126 to alter the voltage produced, thereby generating the output signal. The receiver antenna 126 is responding to a voltage increase from the transmitter antenna 120 swinging over the magnetic line to the material. The pulse module 156 determines, at step 308, if an RF signal was received by the receiver antenna 126. The receiver unit 124 may capture the RF signal that has interacted with the environment and potential target materials using the receiver antenna 126. The receiver antenna 126 may capture the incoming RF signal, if any, which has been transmitted by the transmitter unit 106 and has interacted with the environment and any target materials present. The receiver antenna 126 may be designed to effectively capture these radio waves and convert them back into electrical signals. If the RF signal is received by the receiver antenna 126, it may be fed into an RF amplifier, which boosts the signal strength without significantly altering its characteristics. In some embodiments, the use of the standard atomic structure of a material may be used to calculate the resonant frequency to which a particular substance would generate or respond. Each element and compound comprises a definable atomic structure composed of the total number of protons and neutrons of that target material. This unique nuclear composition of every substance makes it uniquely identifiable and detectable. The manner in which this information is applied thus enables the detection of any target substance. A target material can be detected and located based on a resonant, responsive RF wave and/or magnetic relationship between the target and a transmitter antenna 120 transmitting at a frequency specific and unique to the target material. The transmitter unit 106, through the transmitter antenna 120, induces a resonance due to responsive RF waves and/or magnetic and/or otherwise in a targeted material to resonate at a specific computed frequency. The receiver antenna 126 and receiver circuit 128 detect the resonance induced in the material and, in so doing, indicate the approximate line of bearing to the material. The primary method used by this detection system to detect specific materials is based on tuning the circuit 108 of the transmitter unit 106 to a specific value that is computed for the material of interest. The frequency can be based on any of the three defining characteristics of the substance, the number of protons, the number of neutrons, or the atomic mass, such as the sum of protons and neutrons and combinations thereof. The frequency can be transmitted at varying voltages to compensate for other external effects or interference. If it is determined that an RF signal was received, the pulse module 156 processes, at step 310, the RF signal through the receiver unit 124. The receiver unit 124 processes the received RF signal to extract meaningful data that can be analyzed for the presence of specific materials, which may involve further amplification, filtering, digitization, and initial data processing before the signal is sent to the control panel 146 or network 176 for detailed analysis. In some embodiments, after the RF signal is received and initially amplified, it may require further amplification to ensure the signal is at an optimal level for processing. In some embodiments, an additional RF amplifier within the receiver unit 124 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter, ADC. The ADC samples the analog signal at a high rate and converts it into a series of digital values. The digitized signal may be processed using digital techniques. The digital signal may be fed into a Digital Signal Processor, DSP, within the receiver unit 124. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials. The pulse module 156 stores, at step 312, the processed pulse data in the investigation database 172. The pulse module 156 may store the pulse sequence ID and the received response signal strength in the investigation database 172. In some embodiments, the pulse module 156 may store the processed data from the DSP, characteristics identified in the signal, the target material detected, whether the pulse sequence resulted in a response signal from the target material or not, etc. If it is determined that an RF signal was not received or after the RF signal was received and processed the pulse module 156 determines, at step 314, if more pulse sequences are remaining in the pulse database 166. The pulse module 156 may transmit the frequency associated with the target using each one of the pulse sequences stored in the pulse database 166. If it is determined that more pulse sequences are remaining in the pulse database 166, the pulse module 156 extracts, at step 316, the next pulse sequence in the pulse database 166 and the process returns to configuring the transmit signal. If it is determined that no more pulse sequences are remaining in the pulse database 166 the pulse module 156 returns, at step 318, to the base module 154.

Figure 4:
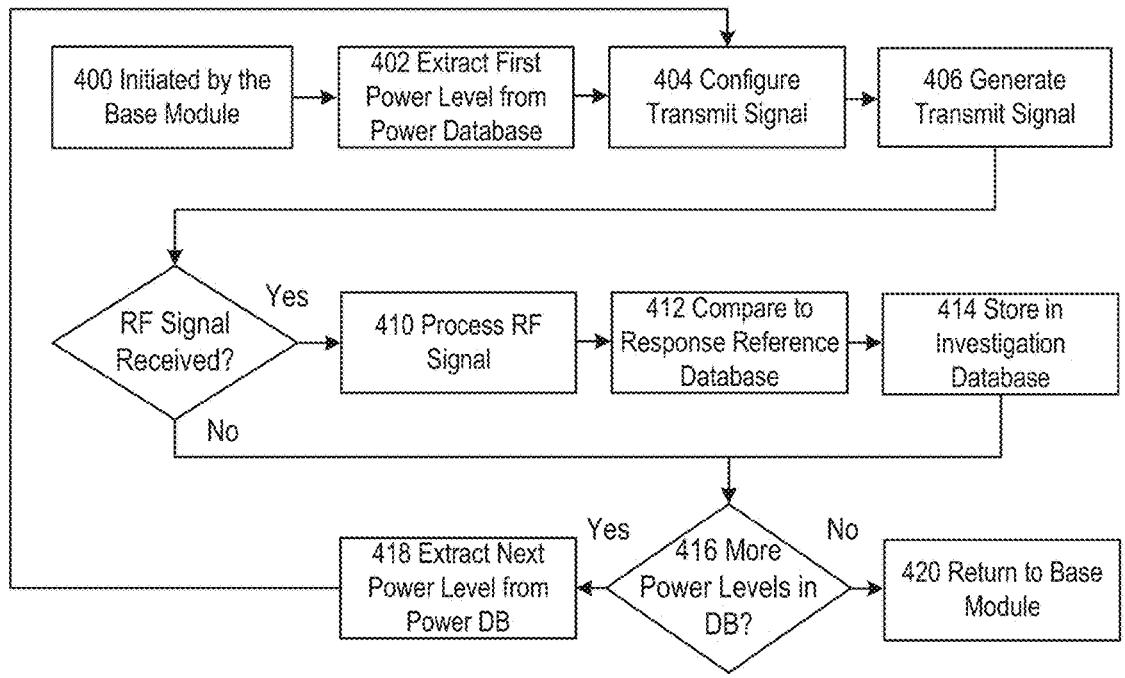
FIG. 4 is a flow chart of a method performed by a Power Module, according to an embodiment.

FIG. 4 illustrates the power module 158. The process begins with the power module 158 being initiated, at step 400, by the base module 154. In some embodiments, the power module 158 may receive the frequency for the specific target material from the base module 154. The power module 158 extracts, at step 402, the first power level from the power database 168. The power database 168 may contain various power levels that the signal is transmitted by the RF detection device 102 through the power module 158, and the response signal is then compared to the response reference database 170, which may determine the quantity or distance of the target material. The power database 168 may contain a power level ID, the power, the amplitude, etc. In some embodiments, the power level ID may be a unique identifier for each power level entry. In some embodiments, the power may be the power level of the transmitted signal in watts. In some embodiments, the amplitude may be the amplitude or strength of the transmitted signal corresponding to the power level. The data entries in the power database 168 may be extracted and transmitted starting from a very low power level to a very high power level through the process described in the power module 158. By varying the power levels and determining if the receiver antenna 126 received a response signal from the target material, the power module 158 may be able to determine the quantity or distance of the target material from the RF detection device 102.

The power module 158 configures, at step 404, the transmit signal through the transmitter unit 106. The transmitter unit 106 prepares the signal that will be transmitted to detect a target material using the extracted power level from the power database 168. In some embodiments, the remaining parameters and components may be set up with the desired characteristics to generate the RF signal. In some embodiments, the control panel 146 may determine the specific parameters of the RF signal that need to be generated, such as the frequency associated with the target material, required to effectively detect the target materials. The control panel 146 sends a command to activate the oscillator circuit within the transmitter unit 106. The oscillator circuit may be responsible for generating a stable RF signal at the desired frequency and may consist of components like capacitors, inductors, and amplifiers that work together to create the oscillating signal. The power delivery to the oscillator circuit may be managed by the SCR 114. When the control panel 146 sends a gate signal to the SCR 114, it switches from a non-conductive to a conductive state, allowing current from the power source, such as batteries, to flow to the oscillator circuit. After the oscillator circuit generates the RF signal, the transformer 116 maintains the voltage level of the signal to match the requirements extracted from the power database 168. It may also provide impedance matching to ensure efficient signal transmission. The transformer 116 ensures that the RF signal is at the appropriate voltage and current levels for transmission. For example, the control panel 146 may determine that an RF signal with a frequency of 50 Hz is required to detect a specific material. It sends a command to the transmitter unit 106 to configure this signal. The oscillator circuit is activated, generating an RF signal at 50 Hz. The SCR 114 is triggered, allowing power from the batteries to flow to the oscillator circuit. The generated signal is then conditioned by the transformer 116, ensuring it is at the correct voltage level for transmission. The power module 158 generates, at step 406, the transmit signal through the transmitter unit 106 via the transmitter antenna 120. The transmitter unit 106 generates the RF signal and transmits it through the transmit antenna 120 by converting electrical energy into radio waves that can be used for detecting specific materials. The transmit antenna 120 radiates the RF signal into the environment. The radio waves propagate through the medium, such as air or ground, and interact with the target materials. The interaction between the RF signal and the target materials will produce detectable changes in the signal, which can be received and analyzed by the receiver unit 124. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 120 and the target. When the RF detection device 102 is aligned with a target material, for example, when the opening of the directional shield 142 is pointing toward the target material, the voltage produced by the receiver antenna 126 changes and thereby produces a detection output signal, such as an audio signal having a tone different than that of the baseline. A response wave is produced by the target material that amplifies, resonates, offsets, or otherwise modifies the magnetic field passing through the receiver antenna 126 to alter the voltage produced, thereby generating the output signal. The receiver antenna 126 is responding to a voltage increase from the transmitter antenna 120 swinging over the magnetic line to the material. The power module 158 determines, at step 408, if an RF signal was received by the receiver antenna 126. The receiver unit 124 may capture the RF signal that has interacted with the environment and potential target materials using the receiver antenna 126. The receiver antenna 126 may capture the incoming RF signal, if any, which has been transmitted by the transmitter unit 106 and has interacted with the environment and any target materials present. The receiver antenna 126 may be designed to effectively capture these radio waves and convert them back into electrical signals. If the RF signal is received by the receiver antenna 126, it may be fed into an RF amplifier, which boosts the signal strength without significantly altering its characteristics. In some embodiments, the use of the standard atomic structure of a material may be used to calculate the resonant frequency to which a particular substance would generate or respond. Each element and compound comprises a definable atomic structure composed of the total number of protons and neutrons of that target material. This unique nuclear composition of every substance makes it uniquely identifiable and detectable. The manner in which this information is applied thus enables the detection of any target substance. A target material can be detected and located based on a resonant, responsive RF wave and/or magnetic relationship between the target and a transmitter antenna 120 transmitting at a frequency specific and unique to the target material. The transmitter unit 106, through the transmitter antenna 120, induces a resonance due to responsive RF waves and/or magnetic and/or otherwise in a targeted material to resonate at a specific computed frequency. The receiver antenna 126 and receiver circuit 128 detect the resonance induced in the material and, in so doing, indicate the approximate line of bearing to the material. The primary method used by this detection system to detect specific materials is based on tuning the circuit 108 of the transmitter unit 106 to a specific value that is computed for the material of interest. The frequency can be based on any of the three defining characteristics of the substance, the number of protons, the number of neutrons, or the atomic mass, such as the sum of protons and neutrons and combinations thereof. The frequency can be transmitted at varying voltages to compensate for other external effects or interference. If it is determined that an RF signal was received, the power module 158 processes, at step 410, the RF signal through the receiver unit 124. The receiver unit 124 processes the received RF signal to extract meaningful data that can be analyzed for the presence of specific materials, which may involve further amplification, filtering, digitization, and initial data processing before the signal is sent to the control panel 146 or network 176 for detailed analysis. In some embodiments, after the RF signal is received and initially amplified, it may require further amplification to ensure the signal is at an optimal level for processing. In some embodiments, an additional RF amplifier within the receiver unit 124 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter, ADC. The ADC samples the analog signal at a high rate and converts it into a series of digital values. The digitized signal may be processed using digital techniques. The digital signal may be fed into a Digital Signal Processor, DSP, within the receiver unit 124. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials. The power module 158 compares, at step 412, the processed RF signal to the response reference database 170. The response reference database 170 may contain pre-calibrated response curves that relate transmitted power levels to received response signal strengths for various known quantities and distances of a target material. The response reference database 170 may contain the target material, the quantity, the distance, and the response signal at the various power levels in decibels. In some embodiments, the response reference database 170 may contain a plurality of target materials that have corresponding response curves, as the response signal from each target material may vary. In some embodiments, the quantity may be the known quantity of the target material. In some embodiments, the distance may be the known distance of the target material. In some embodiments, the response signal at various power levels in decibels may be the strength of the signal received at each specified power level. In some embodiments, the known quantity and distance of the target material may be determined by analyzing historical data of the target material. For example, the historical data may include previous transmissions, such as the various power levels, and responses, such as response signal strength in decibels, for uranium that may be used to determine the quantity or distance. If there is 0.5 kg of uranium at 10 meters, the response signal strength may be −80 dB at power level 1, −70 dB at power level 2, −65 dB at power level 3, and −60 dB at power level 4. If there is 1 kg of uranium at 20 meters, the response signal strength may be −85 dB at power level 1, −75 dB at power level 2, −70 dB at power level 3, and −65 dB at power level 4. For future analysis, the response reference database 170 may be used to determine the quantity or distance for the target material, such as sending a transmission signal at power level 4 for uranium and the response signal strength is −65 dB, it may be determined that the 0.5 kg of uranium is 10 meters away or 1 kg of uranium is 20 meters away. In some embodiments, the response reference database 170 may be used to collect a plurality of response signal strengths, which may be further analyzed to determine the most likely quantity and distance of the target material. The power module 158 stores, at step 414, the processed power response data in the investigation database 172. The power module 158 may store the target material quantities and distance data entries from the response reference database 170 that match the response signal strength. For example, the power module 158 may store the data entry from the response reference database 170 of 0.5 kg of uranium at 10 meters, 1 kg of uranium at 20 meters, etc. In some embodiments, the power module 158 may store all of the potential matches from the response reference database 170 that may be used by the investigation module 162 to further analyze to refine the results to a more closely related match to the target materials quantity and distance. If it is determined that an RF signal was not received or after the RF signal was received and processed the power module 158 determines, at step 416, if more power levels are remaining in the power database 168. If it is determined that more power levels remain in the power database 168, the power module 158 extracts, at step 418, the next power level in the power database 168, and the process returns to configuring the transmit signal. If it is determined that no more power levels are remaining in the power database 168, the power module 158 returns, at step 420, to the base module 154.

Figure 5:
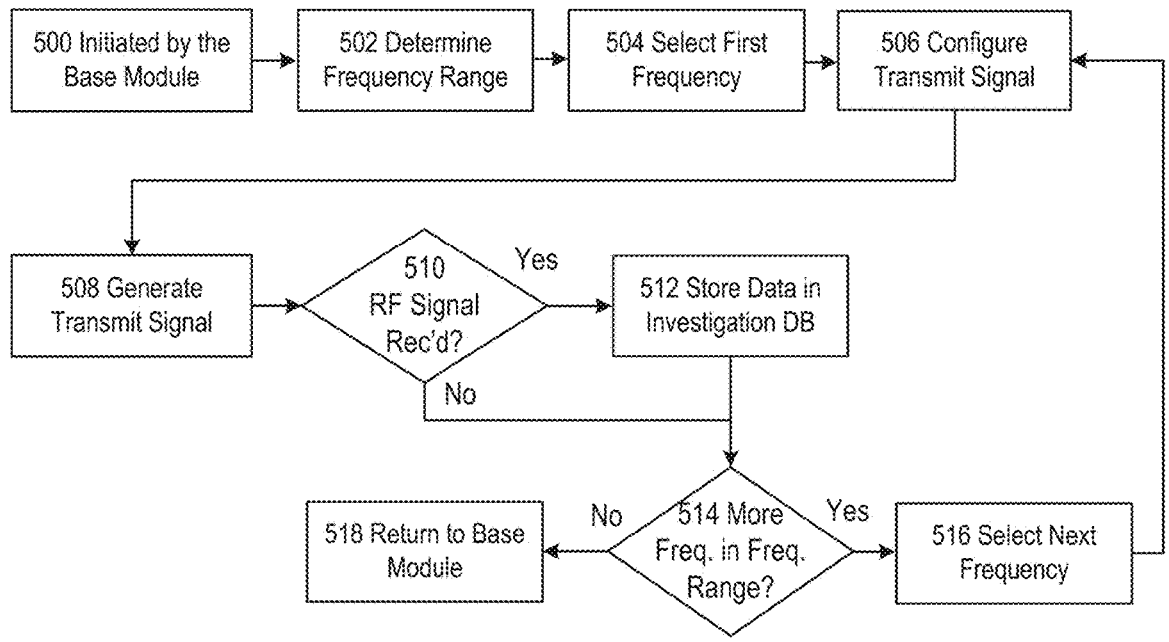
FIG. 5 is a flow chart of a method performed by a Sweep Module, according to an embodiment.

FIG. 5 illustrates the sweep module 160. The process begins with the sweep module 160 being initiated, at step 500, by the base module 154. In some embodiments, the sweep module 160 may receive the target material from the base module 154. The sweep module 160 determines, at step 502, the frequency range for the target material or substance. The sweep module 160 may compare the target material to the specific material database 164 and extract the target material frequency and the frequencies that are close to the target material, such as +/−10 Hz, to create a frequency range that is specifically related to the target material. In some embodiments, the frequency range may be stored temporarily in the memory 150, allowing the sweep module 160 to extract the multiple frequencies that are related to the specific target material. The sweep module 160 selects, at step 504, the first frequency from the frequency range. The sweep module 160 may select the first frequency from the range that is stored in the memory 150. The sweep module 160 configures, at step 506, the transmit signal through the transmitter unit 106.

Varying the frequency in a sweep, such as ±10 Hz around a central frequency, can enhance the detection of materials that respond to a specific frequency. Here are five reasons for this approach.

In one embodiment, there is a need to enhance the Resonant Frequency Variability. Materials often have resonant frequencies that can vary slightly due to manufacturing inconsistencies, impurities, or environmental conditions. By sweeping around the central frequency, the system can ensure that it captures the full range of possible resonant responses, increasing the likelihood of accurate detection.

In another embodiment, there is a need to enhance the Compensation for Environmental Factors. External factors such as temperature, pressure, and electromagnetic interference can shift the resonant frequency of a material. A frequency sweep can account for these shifts, allowing the system to detect the material even when the central frequency is slightly off due to environmental influences.

In another embodiment there is a need to enhance the Broadening Detection Capability. Sweeping the frequency helps in identifying materials with broad or multiple resonant peaks. Some materials might have secondary resonant frequencies that are close to the primary one. By covering a range, the system can detect all relevant frequencies, providing a more comprehensive identification.

In another embodiment, there is a need to enhance the Noise Reduction and Signal Clarity. Different frequencies might experience varying levels of noise and interference. Sweeping through a range allows the system to identify frequencies with the best signal-to-noise ratio, enhancing the clarity of the detected signal and improving overall detection reliability.

In another embodiment, there is a need to enhance the Enhanced Algorithm Performance. Digital Signal Processing (DSP) algorithms can benefit from a range of input frequencies. A frequency sweep provides more data points, allowing the algorithms to better distinguish between the target material and other signals. This can lead to more precise filtering, analysis, and identification of the material.

These reasons demonstrate why incorporating a frequency sweep into the detection process can significantly improve the system's accuracy, robustness, and reliability in identifying target materials.

The transmitter unit 106 prepares the signal that will be transmitted to detect a target material. In some embodiments, the parameters and components may be set up with the desired characteristics to generate the RF signal. Once the parameters are set, the control panel 146 sends a command to activate the oscillator circuit within the transmitter unit 106. The oscillator circuit may be responsible for generating a stable RF signal at the desired frequency and may consist of components like capacitors, inductors, and amplifiers that work together to create the oscillating signal. The power delivery to the oscillator circuit may be managed by the SCR 114. When the control panel 146 sends a gate signal to the SCR 114, it switches from a non-conductive to a conductive state, allowing current from the power source, such as batteries, to flow to the oscillator circuit. After the oscillator circuit generates the RF signal, the transformer 116 adjusts the voltage level of the signal to match the requirements of the transmit antenna 120. It may also provide impedance matching to ensure efficient signal transmission. The transformer 116 ensures that the RF signal is at the appropriate voltage and current levels for optimal transmission. The sweep module 160 generates, at step 508, the transmit signal through the transmitter unit 106 and transmitter antenna 120. The transmitter unit 106 generates the RF signal and transmits it through the transmit antenna 120 by converting electrical energy into radio waves that can be used for detecting specific materials. The transmit antenna 120 radiates the RF signal into the environment. The radio waves propagate through the medium, such as air or ground, and interact with the target materials. The interaction between the RF signal and the target materials will produce detectable changes in the signal, which can be received and analyzed by the receiver unit 124. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 120 and the target. When the RF detection device 102 is aligned with a target material, for example, when the opening of the directional shield 142 is pointing toward the target material, the voltage produced by the receiver antenna 126 changes and thereby produces a detection output signal, such as an audio signal having a tone different than that of the baseline. A reflective wave is produced by the target material that amplifies, resonates, offsets, or otherwise modifies the magnetic field passing through the receiver antenna 126 to alter the voltage produced, thereby generating the output signal. The receiver antenna 126 is responding to a voltage increase from the transmitter antenna 120 swinging over the magnetic line to the material. The sweep module 160 determines, at step 510, if an RF signal was received by the receiver antenna 126. The receiver unit 124 may capture the RF signal that has interacted with the environment and potential target materials using the receiver antenna 126. The receiver antenna 126 may capture the incoming RF signal, which has been transmitted by the transmitter unit 106 and has interacted with the environment and any target materials present. The receiver antenna 126 may be designed to effectively capture these radio waves and convert them back into electrical signals. Once the RF signal is received by the receiver antenna 126, it may be fed into an RF amplifier, which boosts the signal strength without significantly altering its characteristics. The transmitter unit 106, through the transmitter antenna 120, induces a resonance due to responsive RF waves and/or magnetic and/or otherwise in a targeted material to resonate at a specific computed frequency. The receiver antenna 126 and receiver circuit 128 detect the resonance induced in the material and, in so doing, indicate the approximate line of bearing to the material. The receiver unit 124 processes the received RF signal to extract meaningful data that can be analyzed for the presence of specific materials, which may involve further amplification, filtering, digitization, and initial data processing before the signal is sent to the control panel 146 for detailed analysis. In some embodiments, after the RF signal is received and initially amplified, it may require further amplification to ensure the signal is at an optimal level for processing. In some embodiments, an additional RF amplifier within the receiver unit 124 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter, ADC. The ADC samples the analog signal at a high rate and converts it into a series of digital values. The digitized signal may be processed using digital techniques. The digital signal may be fed into a Digital Signal Processor, DSP, within the receiver unit 124. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials. If it is determined that an RF signal was received by the receiver antenna 126, the sweep module 160 stores, at step 512, the data in the investigation database 172. The sweep module 160 may store the transmitted frequency and the response signal that was received by the receiver unit 124 via the receiver antenna 126. By transmitting and receiving a plurality of frequencies, the sweep module 160 may collect additional data used by the investigation module 162 to determine if the target material is detected or if a target material that has a similar frequency is detected. If it is determined that an RF signal was not received or after the data has been stored in the investigation database 172, the sweep module 160 determines, at step 514, if there are more frequencies remaining from the frequency range. If it is determined that there are more frequencies remaining from the frequency range, the sweep module 160 selects, at step 516, the next frequency in the frequency range, and the process returns to configuring the transmit signal. If it is determined that there are no more frequencies remaining from the frequency range, the sweep module 160 returns, at step 518, to the base module 154.

Figures 6, 7:
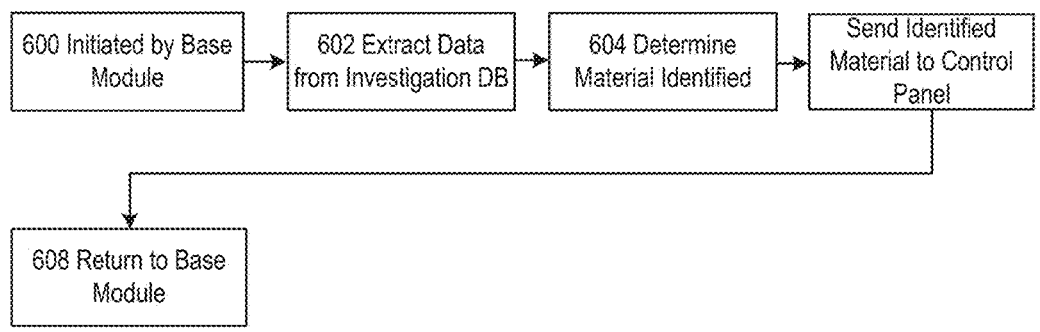
FIG. 6 is a flow chart of a method performed by an Investigation Module, according to an embodiment.
FIG. 7 is a flow chart of a method performed by a Response Reference Database, according to an embodiment.

FIG. 6 illustrates the investigation module 162. The process begins with the investigation module 162 being initiated, at step 600, by the base module 154. The investigation module 162 extracts, at step 602, the data from the investigation database 172. The investigation database 170 may contain processed data from the pulse module 156, power module 158, and the sweep module 160 and may be used by the investigation module 162 to enhance the way in which the target material is detected. In some embodiments, the investigation database 170 may contain data from the pulse module 156, such as the pulse sequence IDs, received signal strengths from each pulse sequence, processed data, characteristics identified in the signals, etc. In some embodiments, the investigation database 170 may contain data from the power module 158, such as the target material quantities and distance data entries from the response reference database 170 that match the response signal strength. For example, the power module 158 may store the data entry from the response reference database 170 of 0.5 kg of uranium at 10 meters, 1 kg of uranium at 20 meters, etc. In some embodiments, the investigation database 170 may contain data from the sweep module 160, such as the transmitted frequency and the response signal that was received by the receiver unit 124 via the receiver antenna 126. In some embodiments, the pulse module 156 data may capture the raw and processed signal data for each pulse sequence, allowing for detailed analysis of signal characteristics and identification of target materials, and the presence or absence of a response signal is recorded to help refine detection accuracy. In some embodiments, the power module 158 data may store potential matches for target material quantities and distances based on the received signal strength at various power levels, which may help in correlating the observed signal patterns with known reference data, facilitating the determination of the most likely target material scenario. In some embodiments, the sweep module 160 may record the transmitted frequencies and corresponding response signals, enabling the differentiation between target materials and other materials with similar frequencies, which may be used to fine-tune the detection process and improve accuracy. The investigation module 162 determines, at step 604, the material identified.

The investigation module 162 uses the results of received RF signals from the pulse changes, power changes, and sweep frequency changes.

The investigation module 162 may use an algorithm to determine if the target material is identified or detected. The algorithm may combine machine learning algorithms and signal processing techniques. The algorithm may begin with data preprocessing, which involves filtering the received signals to remove noise and isolate the relevant frequency bands. The algorithm may then normalize the signal strengths across different power levels to ensure they are on a common scale for easier comparison. Following this, the algorithm extracts features from the signals, such as peak signal strength, signal duration, and response patterns across different frequencies and power levels. For target material detection, the algorithm may implement a thresholding technique where the received signal strength is compared against a predefined threshold value. If the signal strength exceeds the threshold, the algorithm flags the presence of a target material. Pattern matching algorithms, such as cross-correlation, may be used by the algorithm to compare the observed signal patterns with those in the response reference database 170. Additionally, anomaly detection algorithms may be used to identify any unusual patterns that deviate from known noise profiles, further indicating the presence of a target material. To estimate the quantity and distance of the target material, the algorithm may employ curve fitting techniques to match the observed signal strengths at different power levels to the reference curves in the response reference database 170. In some embodiments, polynomial regression or spline interpolation models the relationship between response signal strength, quantity, and distance. In some embodiments, the Least Squares Method may be implemented to minimize the sum of squared residuals between observed data and reference data, helping to determine the most likely quantity and distance. In some embodiments, Bayesian inference may update the probabilities of different quantity and distance hypotheses based on the observed data. For the detection of related target materials, the algorithm may perform frequency sweep analysis on the data collected from the sweep module to identify any frequencies that match those of related target materials. Clustering algorithms, such as K-means or hierarchical clustering, group similar signal patterns, helping to identify clusters of related materials based on their frequency responses. Multi-frequency matching algorithms may check for overlapping frequency responses that may indicate the presence of related materials, such as uranium and neptunium, which have overlapping frequencies. An example of the algorithm process may be filtering the received signals using a bandpass filter centered around the target frequency, followed by normalization and feature extraction. For target material detection, the algorithm compares normalized signal strengths to predefined thresholds and uses cross-correlation to match the observed signal pattern with reference patterns. Anomaly detection identifies significant deviations indicating the presence of a target material. In estimating quantity and distance, the algorithm may fit the observed signal strengths at various power levels to reference curves using polynomial regression. It calculates the residuals for each reference entry and uses the Least Squares Method to find the best match. Bayesian inference refines the estimates of quantity and distance. For the detection of related target materials, the algorithm may analyze frequency sweep data to detect additional frequencies corresponding to related materials and clustering algorithms group similar signal patterns. Multi-frequency matching determines if related materials are present alongside the target material. The investigation module 162 sends, at step 606, the identified material parameters to the control panel 146. For example, the investigation module 162 may display the results from the algorithm on the control panel 146, such as the material detected, confidence level, estimated quantity, estimated distance, detected related materials, the confidence level of the detected related materials, etc. In some embodiments, the control panel 146 may display a graphical representation of the target material, such as a graph plotting the received signal strength against different power levels, showing the response curve of the detected material, or a quantity vs. distance estimation that displays a 2D plot or heatmap displaying the estimated quantity against distance, highlighting the probable location of the material. In some embodiments, the investigation module 162 may connect to the network 176 and send the data collected or processed by the RF detection device 102, allowing the user or operator to view and further analyze the data. The investigation module 162 returns, at step 608, to the base module 154.

FIG. 7 illustrates the response reference database 170. The response reference database 170 may contain pre-calibrated response curves that relate transmitted power levels to received response signal strengths for various known quantities and distances of a target material. The response reference database 170 may contain the target material, the quantity, the distance, and the response signal at the various power levels in decibels. In some embodiments, the response reference database 170 may contain a plurality of target materials that have corresponding response curves, as the response signal from each target material may vary. In some embodiments, the quantity may be the known quantity of the target material. In some embodiments, the distance may be the known distance of the target material. In some embodiments, the response signal at various power levels in decibels may be the strength of the signal received at each specified power level. In some embodiments, the known quantity and distance of the target material may be determined by analyzing historical data of the target material. For example, the historical data may include previous transmissions, such as the various power levels, and responses, such as response signal strength in decibels, for uranium that may be used to determine the quantity or distance. If there is 0.5 kg of uranium at 10 meters, the response signal strength may be −80 dB at power level 1, −70 dB at power level 2, −65 dB at power level 3, and −60 dB at power level 4. If there is 1 kg of uranium at 20 meters, the response signal strength may be −85 dB at power level 1, −75 dB at power level 2, −70 dB at power level 3, and −65 dB at power level 4. For future analysis, the response reference database 170 may be used to determine the quantity or distance for the target material, such as sending a transmission signal at power level 4 for uranium and the response signal strength is −65 dB, it may be determined that the 0.5 kg of uranium is 10 meters away or 1 kg of uranium is 20 meters away. In some embodiments, the response reference database 170 may be used to collect a plurality of response signal strengths, which may be further analyzed to determine the most likely quantity and distance of the target material.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method for material detection and identification, the method comprising:
    accessing a material database associating each of a plurality of materials with a resonance frequency and one or more transmission parameters; and
    for each material of at least a subset of the plurality of materials in the material database:
        transmitting into an environment an RF signal the resonance frequency for the material using the one or more transmission parameters;
        receiving a response signal from the environment;
        analyzing the response signal for resonance characteristics that indicate a presence of the material; and
        identifying the material to a user if the presence of the material is indicated by the resonance characteristics.

2. The method of claim 1, wherein the one or more transmission parameters include pulse sequence parameters.

3. The method of claim 2, wherein the pulse sequence parameters include one or more of a pulse duration, a pulse interval, and a pulse count.

4. The method of claim 2, wherein analyzing the response signal includes determining if the response signal is received between each pulse sequence.

5. The method of claim 1, wherein the one or more transmission parameters include one or more of a power level and an amplitude.

6. The method of claim 5, wherein transmitting includes transmitting into the environment the RF signal the resonance frequency at varying power levels and/or amplitudes.

7. The method of claim 5, wherein the material database includes one or more pre-calibrated response curves relating transmitted power levels to received response signal strengths for known quantities and/or distances of the materials;
    wherein analyzing includes determining a quantity and/or distance of the material based on the one or more pre-calibrated response curves.

8. The method of claim 1, wherein the one or more transmission parameters include a frequency range for the material, wherein the resonance frequency is contained within the frequency range, and wherein transmitting includes transmitting into the environment a plurality of RF signals within the frequency range for the material.

9. The method of claim 8, wherein the resonance frequency is centered within the frequency range.

10. The method of claim 1, wherein the material is a controlled substance.

11. A system for material detection and identification, the system comprising:
    an interface configured to access a material database associating each of a plurality of materials with a resonance frequency and one or more transmission parameters; and
    an RF transmitter configured to, for each material of at least a subset of the plurality of materials in the material database transmit into an environment an RF signal the resonance frequency for the material using the one or more transmission parameters;

an RF receiver configured to receive a response signal from the environment;

a processor configured to analyze the response signal for resonance characteristics that indicate a presence of the material and identify the material to a user if the presence of the material is indicated by the resonance characteristics.

12. The system of claim 11, wherein the one or more transmission parameters include pulse sequence parameters.

13. The system of claim 12, wherein the pulse sequence parameters include one or more of a pulse duration, a pulse interval, and a pulse count.

14. The system of claim 12, wherein analyzing the response signal includes determining if the response signal is received between each pulse sequence.

15. The system of claim 11, wherein the one or more transmission parameters include one or more of a power level and an amplitude.

16. The system of claim 15, wherein transmitting includes transmitting into the environment the RF signal the resonance frequency at varying power levels and/or amplitudes.

17. The system of claim 15, wherein the material database includes one or more pre-calibrated response curves relating transmitted power levels to received response signal strengths for known quantities and/or distances of the materials;

wherein analyzing includes determining a quantity and/or distance of the material based on the one or more pre-calibrated response curves.

18. The system of claim 11, wherein the one or more transmission parameters include a frequency range for the material, wherein the resonance frequency is contained within the frequency range, and wherein transmitting includes transmitting into the environment a plurality of RF signals within the frequency range for the material.

19. The system of claim 18, wherein the resonance frequency is centered within the frequency range.

20. The system of claim 11, wherein the material is a controlled substance.

\* \* \* \* \*